US012253224B1

United States Patent
Yerli et al.

(10) Patent No.: US 12,253,224 B1
(45) Date of Patent: Mar. 18, 2025

(54) MULTIFUNCTIONAL INTERACTIVE ILLUMINATION APPARATUS

(71) Applicant: TMRW FOUNDATION IP S.ÀR.L., Luxembourg (LU)

(72) Inventors: Cevat Yerli, Dubai (AE); Neva Yerli, Dubai (AE)

(73) Assignee: TMRW FOUNDATION IP S.ÀR.L., Luxembourg (LU)

( * ) Notice: Subject to any disclaimer, the term of this patent is extended or adjusted under 35 U.S.C. 154(b) by 0 days.

(21) Appl. No.: 18/511,645

(22) Filed: Nov. 16, 2023

(51) Int. Cl.
| | |
|---|---|
| *F21L 4/08* | (2006.01) |
| *F21V 14/00* | (2018.01) |
| *F21W 111/10* | (2006.01) |
| *G06F 3/041* | (2006.01) |
| *G06F 3/0484* | (2022.01) |
| *G06F 3/0488* | (2022.01) |
| *G06F 3/16* | (2006.01) |

(52) U.S. Cl.
CPC ............ *F21L 4/085* (2013.01); *F21V 14/003* (2013.01); *G06F 3/0416* (2013.01); *G06F 3/0484* (2013.01); *G06F 3/0488* (2013.01); *F21W 2111/10* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 9,134,799 B2 | 9/2015 | Mark | |
| 9,762,757 B2* | 9/2017 | Kim | H04N 1/0035 |
| 2012/0017147 A1* | 1/2012 | Mark | G06F 3/0346 |
| | | | 715/848 |
| 2013/0342704 A1* | 12/2013 | Williams | G06F 3/0354 |
| | | | 348/838 |
| 2020/0088369 A1 | 3/2020 | Keisling et al. | |
| 2022/0373168 A1 | 11/2022 | Stallings et al. | |
| 2023/0120724 A1* | 4/2023 | Jeong | F21S 9/037 |
| | | | 362/157 |

* cited by examiner

*Primary Examiner* — Stephen T. Reed
(74) *Attorney, Agent, or Firm* — BRYAN CAVE LEIGHTON PAISNER LLP

(57) ABSTRACT

An interactive illumination apparatus and methods and systems for executing functions of the interactive illumination apparatus are disclosed. The interactive illumination apparatus includes a housing, a light emitting device arranged on a first end of the housing, a first button on the housing configured to detect a first input, a touch input device on the housing configured to receive a touch input from a user, and a battery in the housing. The light emitting device may be configured to generate a first illumination based on the first input. The light emitting unit may be configured to generate a second illumination based on the touch input.

18 Claims, 16 Drawing Sheets

MULTIFUNCTIONAL INTERACTIVE ILLUMINATION APPARATUS

TECHNICAL FIELD

The present disclosure relates to systems and methods for generating illumination, more particularly, to a multifunctional interactive illumination apparatus and systems and methods for generating illumination for the multifunctional interactive illumination apparatus.

BACKGROUND

Flashlights and other portable illumination devices provide lighting in various situations where visibility may be limited. Flashlights are generally powered by one or more batteries. A switch is usually located on the flashlight body to turn the light on or off. Flashlights can serve as an important part of an emergency kit, which can be important for survival in an emergency situation. These conventional flashlights are convenient and portable, but they lack useful functionalities that may be helpful for effectively responding to emergency situations and avoiding potential dangers.

The present disclosure is directed to overcoming one or more of these above-referenced challenges and deficiencies. The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, multifunctional interactive illumination apparatuses, systems and methods are disclosed for improving conventional flashlights. Each of the aspects disclosed herein may include one or more of the features described in connection with any of the other disclosed aspects.

According to one aspect, an interactive illumination apparatus is provided. The interactive illumination apparatus may include: a housing; a light emitting device arranged on a first end of the housing; a first button on the housing configured to detect a first input; a touch input device on the housing configured to receive a touch input from a user; and a battery in the housing. The light emitting device may be configured to generate a first illumination based on the first input. The light emitting unit may be configured to generate a second illumination based on the touch input.

Any of the interactive illumination apparatus described herein may include any of the following features. The interactive illumination apparatus may include a solar panel on the housing. The solar panel may be configured to generate power to charge the rechargeable battery. The light emitting device may include a plurality of light emitting diodes or a laser excited phosphors. The interactive illumination apparatus may include a second button configured to detect a second input. The light emitting unit may be configured to generate a third illumination based on the second input. The touch input device may be configured to detect a writing on the touchscreen. The light emitting device may be configured to generate the second illumination based on the writing. The second illumination may include at least one of an image, a text, a shape, or a combination thereof. The touch input device may include a touchscreen display. The touchscreen display may be configured to display a user interface including a graphical input element. The interactive illumination apparatus may include a second button configured to detect a second input, and a speaker and a microphone in the housing. The microphone may be configured to detect an audio command of the user, and the speaker is configured to generate a first sound or a third illumination based on the audio command. The interactive illumination apparatus may include a sensing unit in the housing configured to detect a position of the apparatus. The light emitting unit may be configured to generate the first illumination based on a first position of the apparatus, and the light emitting unit may be configured to generate a third illumination based on a second position of the apparatus. The light emitting unit may include a mask. The mask may be a programmable mask. The mask may be configured to change a shape of the mask based on first input or the touch input. The interactive illumination apparatus may include a third button on the housing configured to detect a third input. The touchscreen device may be configured to activate based on the third input. The interactive illumination apparatus may include a fourth button on the housing configured to detect a fourth input. Intensity of the first illumination may be modified or a size of the first illumination may be modified based on the fourth input.

According to one aspect, a method is provided for executing functions of an interactive illumination apparatus. The method may include: receiving a first input signal from a first button; upon receiving the first input signal, generating a first illumination signal; generating a first illumination based on the first illumination signal; receiving a second input signal from a second button; upon receiving the second input signal, generating a second illumination signal; generating a second illumination based on the second illumination signal; receiving a third input signal from a touch input device; upon receiving the third input signal, generating a third illumination signal; and generating a third illumination based on the third illumination signal.

Any of the methods described here may include any of the following steps or features. The method may further include receiving a third input signal from a third button, and upon receiving the third input signal, activating the touch input device. The method may further include the steps of: receiving the second input signal for a first time period; upon receiving the second input signal for the first time period, generating one or more vibrations via a vibrating device; and upon receiving the second input signal for the first time period, transmitting a cellular or satellite call to a first number. The method may further include the steps of: after receiving the second input signal for the first time period, receiving an additional input signal from the second button for a second period of time; and upon receiving the additional input signal for the second period of time, generating an audio output. The method may further include the steps of: determining a first orientation of the interactive illumination apparatus; upon determining the first orientation, generating a fourth illumination based on a fourth illumination signal; determining a second orientation of the interactive illumination apparatus; and upon determining the second orientation, generating a fifth illumination based on a fifth illumination signal. The method may further include the steps of: determining a first orientation of the interactive illumination apparatus; upon determining the first orientation, generating a fourth illumination based on a fourth illumination signal; determining a second orientation of the interactive illumination apparatus; and upon determining the second orientation, turning off the fourth illumination. The method may further include the steps of: receiving a fourth input signal from a fourth button; and upon receiving the fourth input signal, modifying intensity of the first illumination or modifying a size of the first illumination.

According to one aspect, a non-transitory computer-readable medium may store instructions for executing functions of an interactive illumination apparatus, the instructions, when executed by one or more processors, causing the one or more processors to perform operations comprising: receiving a first input signal from a first button; upon receiving the first input signal, generating a first illumination signal; generating a first illumination based on the first illumination signal; receiving a second input signal from a second button; upon receiving the second input signal, generating a second illumination signal; generating a second illumination based on the second illumination signal; receiving a third input signal from a touch input device; upon receiving the third input signal, generating a third illumination signal; and generating a third illumination based on the third illumination signal.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary aspects of the disclosure and together with the description, serve to explain the principles of the present disclosure.

DETAILED DESCRIPTION

Figure 1A:
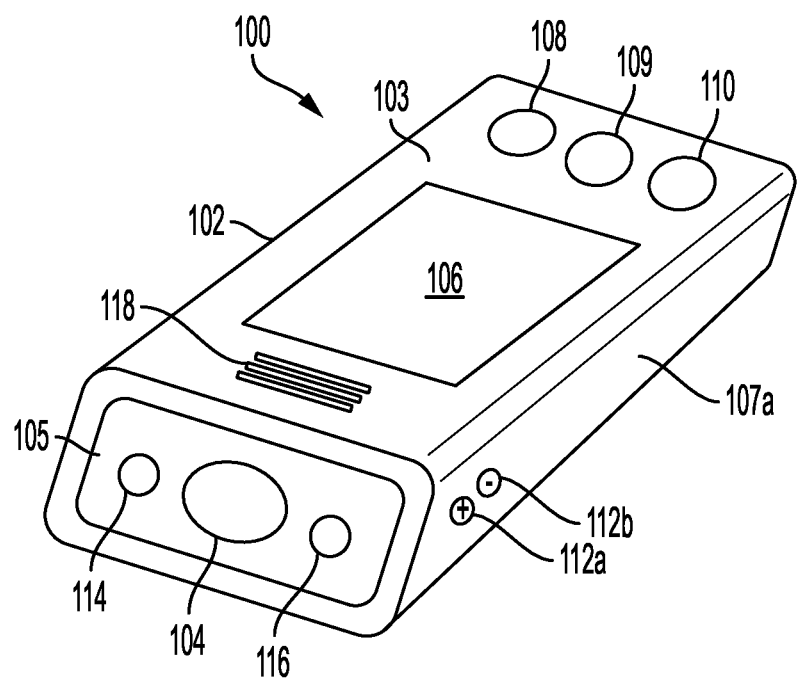
FIG. 1A illustrates a perspective view of an exemplary illumination apparatus, according to aspects of the present disclosure.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The terms including the ordinal number such as "first", "second" and the like, may be used to distinguish one element from another among various elements, but not intended to limit the elements by the terms. The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a nonexclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±5% of a stated or understood value.

In addition, throughout the specification, when a portion is referred to as being "connected" or "coupled" to another portion, it is not limited to the case that they are "directly connected" or "directly coupled", but it also includes the case where they are "indirectly connected" or "indirectly coupled" with one or more elements being arranged between them.

For ease of description, portions of the disclosed devices and/or their components are referred to as proximal and distal portions. It should be noted that the term "proximal" is intended to refer to portions closer to a light source of the illumination apparatus of the present disclosure, and the term "distal" is used herein to refer to portions further away from the light source of the illumination apparatus, e.g., toward a bottom side of the illumination apparatus including a battery charging port. Similarly, extends "distally" indicates that a component extends in a distal direction, and extends "proximally" indicates that a component extends in a proximal direction. Additionally, terms that indicate the geometric shape of a component/surface may refer to exact and approximate shapes. Various portions, e.g., proximal or distal portions, of the illumination apparatus may also be referred by using ordinal numbers such as "first", "second", and the like, to distinguish one position, location and/or orientation from another, but not intended to limit the position, location, and/or orientation by the terms.

As discussed above, conventional flashlights lack useful functionalities that may be helpful for effectively responding to emergency situations and avoiding potential dangers. To address these problems, the present disclosure describes a multifunctional interactive illumination apparatus that is configured to generate illumination based on operation of one or more switches and a touchscreen input device by a user. Different illuminations may be generated based signals generated by at least one of the one or more switches, the touchscreen input device, an orientation or position sensing device, or a microphone. The illumination generated by the apparatus of the present disclosure may include messages, patterns, shapes, images, or video from the light generated by light emitting devices. Additionally, the apparatus of the present disclosure may include a speaker that may be configured to generate an alarm, siren, or other sounds based on signals generated by at least one of the one or more switches, the touchscreen input device, an orientation or position sensing device, or a microphone.

The multifunctional interactive illumination apparatus of the present disclosure improves the conventional flashlight technology by providing, among other things, illumination and sounds with programmable messages that can be utilized in various applications including, for example, but not limited to, emergency, security, entertainment, advertising, social, and gaming applications.

FIG. 1A shows a perspective view of an exemplary multifunctional interactive illumination apparatus 100, according to one or more aspects of the present disclosure. The illumination apparatus 100 may be a flashlight or any other suitable light generating device configured to operate in accordance with one or more embodiments of the present disclosure. The illumination apparatus 100 may include a housing 102 and a touchscreen input device 106 on a front surface 103 of the housing 102, as shown in FIG. 1A. The housing 102 may be water resistant or waterproof. One or more means may be employed to seal the housing 102 to prevent water from entering the inside of the housing 102. The one or more means may be rubber, sealant, adhesive, or any other suitable material applied at joints or other areas of the housing 102 to provide water resistant or waterproof characteristics to the apparatus 100. The illumination apparatus 100 may also include light emitting devices 104, 114, 116 disposed on a top surface 105 at the proximal end of the housing 102, and a battery (not shown in this figure for clarity of illustration) inside of the housing 102 configured to provide sufficient electrical power to the light emitting devices 104, 114, 116. In the present disclosure, the battery may provide sufficient power to all components of the apparatus 100 requiring electrical power. In one embodiment, the battery may be a rechargeable battery, but is not limited thereto. The illumination apparatus 100 may also include a plurality of control buttons 108, 109, 110 on the front surface 103 near a distal end of the housing 102, and a microphone/speaker unit 118 on the front surface 103 near the proximal end of the housing 102. However, the locations of the control buttons 108, 109, 110 are not limited thereto. In this disclosure, the term button and switch are used interchangeably. The illumination apparatus 100 may also include intensity control buttons 112a, 112b on a side surface 107a near the proximal end of the housing 102, as shown in FIG. 1A, but the location of the intensity control buttons 112a, 112b is not limited thereto. In the present disclosure the control buttons 108, 109, 110, 112a, and 112b may be mechanically actuated or electrically actuated. For example, the control buttons 108, 109, 110, 112a, and 112b may include spring loaded mechanism to impart tactile feedback to the user when pressed. Alternatively, the control buttons 108, 109, 110, 112a, and 112b may include capacitive or resistive touch sensors and/or piezoelectric switches. Additionally, the control buttons 108, 109, 110, 112a, and 112b may include integrated haptic or vibration generators to impart haptic signals or vibrations upon activation.

Still referring to FIG. 1A, in one embodiment, the light emitting device 104 may comprise a plurality of light emitting diodes (LED) and/or laser excited phosphors (LEP) that are configured and arranged to generate various light or patterns of illumination in accordance with the present disclosure (later discuss in detail). The light emitting devices 114 and 116 may include lasers that are configured to generate one or more light beams or one or more patterns of light beams. The light beams generated by the light emitting devices 114 and 116 may be used as a pointer or for signaling in various environments. For example, one or more patterns of light generated by the light emitting devices 114 and 116 may be projected onto one or more surfaces of a surrounding area to signal or alert, for example, in cases of an emergency or other situations. Of course, the light emitting devices 114 and 116 may also be utilized as a standard laser pointer used, for example, during a presentation or a lecture, or may be utilized for various other entertainment purposes.

In one embodiment, the touch screen input device 106 may comprise a capacitive or resistive sensor integrated with a liquid crystal display, an organic LED (OLED), electrophoretic display, or any other suitable display. The touchscreen input device 106 may be configured to receive touch or gesture input from a user via one or more fingers, a stylus, or any other suitable input device. The touchscreen input device 106 may generate one or more user interfaces configured to display graphical elements designed for interacting with the user. For example, upon actuation by touch, the graphical elements may be configured to generate or transmit appropriate signals control the light emitting device 104, 114, and/or 116 of the apparatus 100 to generate a desired type of illumination (later discussed in detail).

In one embodiment, the control button 108 may be a power on/off switch, the control button 109 may be a touchscreen on/off switch, and the control button 110 may be an emergency switch. For example, when the power on/off switch 108 is pressed or actuated, the apparatus 110 may be turned on to generate light from the light emitting device 104, 114, and/or 116. In some embodiments, the touchscreen input device 106 may turn on to display an image (e.g., a brand logo) for a predetermined period of time (e.g., two seconds, but not limited thereto) and then turn off thereafter. When the power on/off switch 108 is pressed again, the apparatus 110 may be turned off. In some embodiments, the touchscreen input device 106 may turn on to display an image (e.g., a brand logo) for a predetermined period of time (e.g., two seconds, but not limited thereto) and then turn off thereafter.

In one embodiment, when the power of the apparatus 100 is on, the touch screen on/off switch 109 may be pressed or actuated to activate the touchscreen input device 106 to display a graphical user interface. The user interface may provide one or more options for the user to provide input to the touchscreen input device 106 for controlling illumination of the apparatus 100 (later discussed in detail in connection with FIGS. 5A-C). In some embodiments, activating an element on the user interface of the touchscreen input device 106 may generate one or more sounds. For example, the one or more sounds may be generated by the microphone/speaker unit 118.

In one embodiment, the emergency switch 110 may be pressed or actuated for at least a predetermined period of time (e.g., few seconds, but not limited thereto) to put the apparatus 100 in one or more emergency modes. For example, if the emergency switch 110 is pressed, for example, for three seconds, but not limited thereto, the apparatus 100 may activate a silent alert mode. In the silent alert mode, for example, an emergency signal or call may be transmitted automatically to an appropriate emergency or help entity or facility, for example, a police station, a fire station, first responders, or other suitable emergency services. Additionally or alternatively, the apparatus 100 may be programmed to include one or more phone numbers for the automatic transmission of the emergency signal or call. Further, the apparatus 100 may place the live emergency calls via cellular or satellite signals to facilitate live communication with appropriate entities. Additionally, the apparatus 100 may transmit a global position system (GPS) coordinate information to above-described services and entities. In one embodiment, when the emergency switch 110 is pressed and held, vibrations may be generated at each second to aid the user to count the number of seconds for entering the desired emergency mode. For example, to enter the silent alert mode, a user may press and hold the emergency switch 110 for three vibrations and then release. The vibrations will aid the user to enter the silent alert mode discretely in situations where the activation of the emergency mode in sight could put the user in potential danger, for example, from a potential criminal.

In one embodiment, pressing or activating and holding the emergency switch 110 after the apparatus 100 has entered the silent alert mode may trigger the apparatus 100 to enter into a loud alert mode. In the loud alert mode, for example, in addition to transmitting the emergency signal or call and the GPS coordinate information, loud alarm or other suitable sounds may be generated, for example, by the microphone/speaker unit 118. Additionally, the apparatus 100 may generate illumination including an S.O.S. or other suitable emergency messages. In an emergency situation, for example, the apparatus 100 in the loud alert mode may aid any responder or helper in the vicinity of the user to easily locate the user by following the loud alarm or sound and the illumination with the S.O.S. or other suitable emergency messages. Similar to the silent alert mode, the loud alert mode may be triggered when the emergency switch 110 is pressed and held for a predetermined period of time either during the silent alert mode or the normal mode. That is, if the apparatus 100 is already in the silent alert mode, the emergency switch 119 may be pressed and held, for example, for three seconds, but not limited thereto. Alternatively, if the apparatus 100 is not in the silent alert mode and is in a normal power on or power off mode, the emergency switch 119 may be pressed and held, for example, for five seconds. Similar to the silent mode, vibrations may be generated at each second to aid the user to count the number of seconds for entering the desired emergency mode based on the haptic or vibration feedback. For example, to enter the loud alert mode from the silent alert mode, a user may press and hold the emergency switch 110 for three vibrations and then release. Alternatively, to enter the loud mode from a normal power on or power off mode, a user may press and hold the emergency switch 110 for five vibrations and then release. The vibrations will aid the user to enter the loud alert mode to alert any responders or helpers to find the user, for example, in distress. Additionally, the loud alert and sound and illumination generated by the apparatus 100 may scare potential criminals away from the user that may be in a compromising or dangerous situation.

Still referring to FIG. 1A, in one embodiment, the intensity control buttons 112a, 112b may include "+" and "−" buttons. For example, the intensity + button 112a may increase the intensity of the illumination generated by the light emitting device 104, and the intensity − button 112b may decrease the intensity of the illumination. That is, when the intensity + button 112a is pressed, the illumination generated by the light emitting device 104 may get brighter. Each time the intensity + button 112a is pressed, the brightness or intensity may increase incrementally. Similarly, when the intensity − button 112b is pressed, the illumination generated by the light emitting device 104 may get darker. Each time the intensity − button 112b is pressed, the brightness or intensity may decrease incrementally.

Figure 1B:
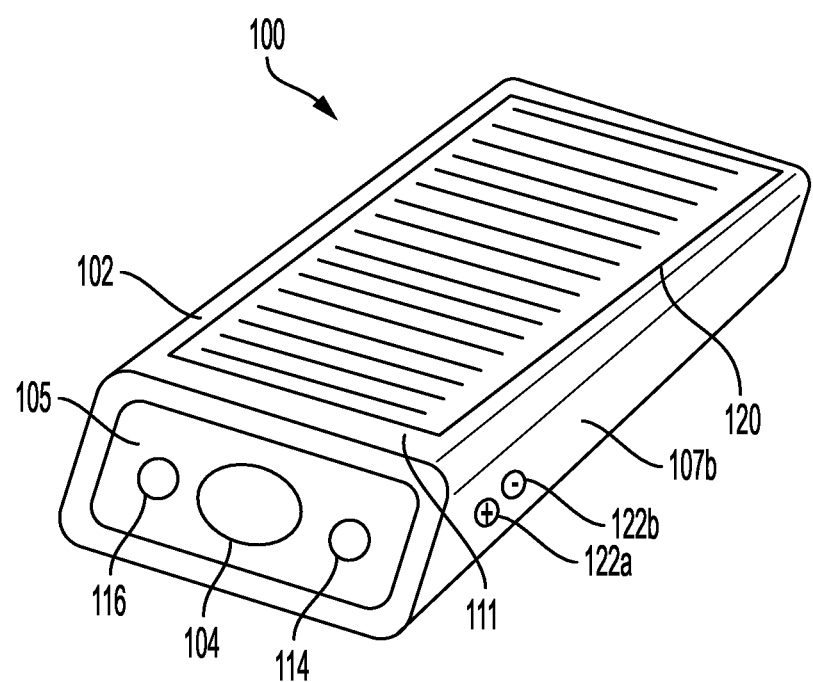
FIG. 1B illustrates a perspective view showing another orientation of the exemplary illumination apparatus shown in FIG. 1A, according to aspects of the present disclosure.

FIG. 1B shows another perspective view of the illumination apparatus 100, according to one or more aspects of the present disclosure. In this embodiment, a back surface 111 of the housing 102 of the apparatus 100 is shown. In this embodiment, the illumination apparatus 100 may include a solar panel 120 on the back surface 111 of the housing 102. The solar panel 120 may generate electrical power when exposed to sunlight to charge the rechargeable battery in the apparatus 120. In one embodiment, if battery power is not sufficient, touchscreen input device 106 may display an out of power message (e.g., "empty battery"). Additionally, the illumination apparatus 100 may include beam control buttons 122a, 122b on a side surface 107b near the proximal end of the housing 102 and opposite the side surface 107a where the control buttons 112a, 112b are disposed, as shown in FIG. 1B, but the location of the beam control buttons 122a, 122b is not limited thereto. The control buttons 122a, and 122b may be mechanically actuated or electrically actuated. For example, the control buttons 122a and 122b may include spring loaded mechanism to impart tactile feedback to the user when pressed. Alternatively, the control buttons 122a, and 122b may include capacitive or resistive touch sensors and/or piezoelectric switches. Additionally, the control buttons 122a, and 122b may include integrated haptic or vibration generators to impart haptic signals or vibrations upon activation.

In one embodiment, the beam control buttons 122a, 122b may include "+" and "−" buttons. For example, the beam + button 122a may increase the size or change shape of the illumination generated by the light emitting device 104, and the beam − button 122b may decrease the size or change shape of the illumination. That is, when the beam + button 122a is pressed, the illumination generated by the light emitting device 104 may get bigger or change shape. For example, if the illumination has a projected conical shape, the width and/or length of the conical shape may increase. Each time the beam + button 122a is pressed, the shape or size of the illumination may change or increase incrementally. Similarly, when the beam − button 122b is pressed, the illumination generated by the light emitting device 104 may get smaller or change shape. For example, if the illumination has a projected conical shape, the width and/or length of the conical shape may decrease. Each time the beam − button 122b is pressed, the shape or size of the illumination may change or decrease incrementally. The control buttons 112a, 112b, 122a, and 122b may not be limited to control the intensity and beam size/shape of the illumination generated by the apparatus. In some embodiments, one or more of the control buttons 112a, 112b, 122a, and 122b may be programmed to control the volume of the sound generated by the microphone/speaker unit 118 based on one or more modes of the apparatus 100. For example, when the apparatus 100 is in the loud mode, one or more of the control buttons 112a, 112b, 122a, and 122b may be programmed to control the level of volume of the loud alarm or other sounds that may be generated by the microphone/speaker unit 118. For example, when the beam + button 122a or the intensity + button 112a is pressed, the alarm or other sounds generated during the loud mode may get louder, and when the beam − button 122b or the intensity − button 112b is pressed, the alarm or other sounds may get quieter.

Figure 1C:
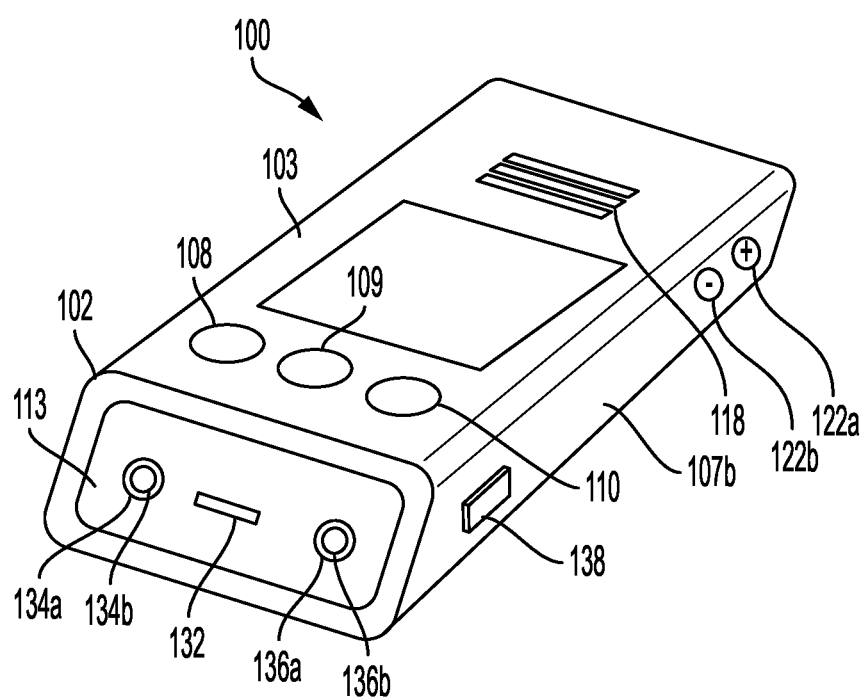
FIG. 1C illustrates a perspective view of an exemplary illumination apparatus, according to aspects of the present disclosure.

FIG. 1C shows another perspective view of the illumination apparatus 100, according to one or more aspects of the present disclosure. In this embodiment, the front surface 103, a bottom surface 105, and the side surface 107b of the housing 102 is shown. In one embodiment, the apparatus 100 may include a charging port 132 on the bottom surface 105 at the distal end of the apparatus 100. The charging port 132 may supply electrical power to the battery in the housing 102 to charge the battery in the housing 102. The charging port 132 may be configured to support USB, Micro USB, USB-C, or any other suitable connector type. In one embodiment, the charging port 132 may be utilized to communicate data with a computing device for programming or updating the software or firmware installed on the apparatus. Of course, any other suitable data may be transmitted and received to and from the apparatus 100 via the charging port 132 to facilitate the functionality of the apparatus 100 in accordance with embodiments of the present disclosure. Additionally, the apparatus 100 may include rod or bar accommodating openings 134a and 136a (hereinafter openings 134a, 136a). Rods or bars 134b and 136b (hereinafter rods 134b, 136b) may be disposed inside of the housing 102 through the openings 134a and 136a, respectively. The rods may be made of metal, plastic, or other suitable material for being inserted into a surface, for example, a ground surface. The apparatus 100 may also include an actuator 138 on the side surface 107b configured to be pressed in. The actuator 138 may include a button that is coupled to a spring mechanism inside of the housing 102 to release the rods 134b and 136 when pressed by a user.

Figure 1D:
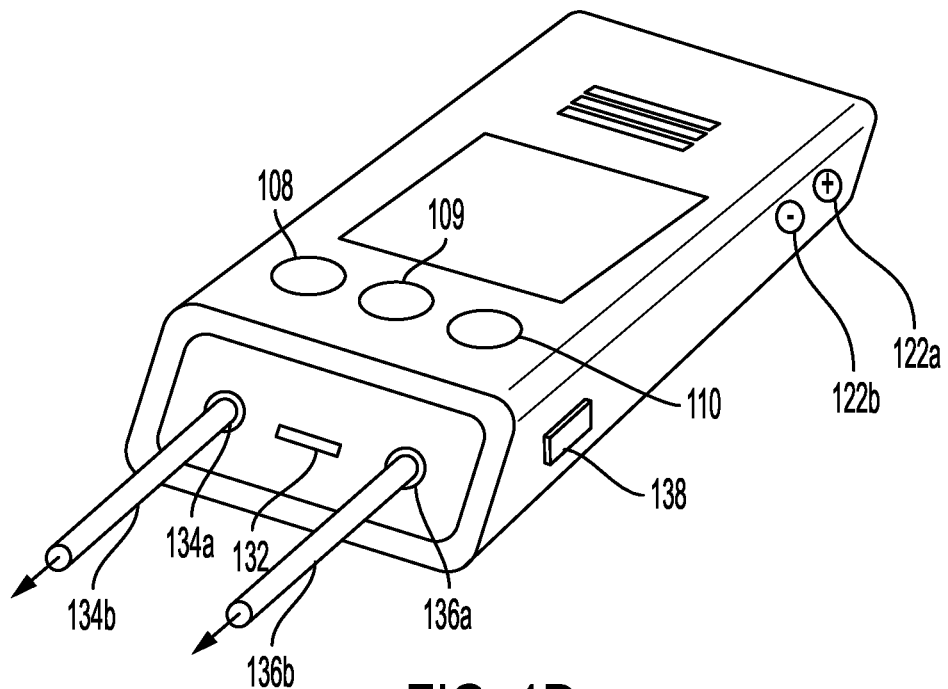
FIG. 1D illustrates a perspective view showing a side of the exemplary illumination apparatus of FIG. 1C having configuration for projecting rods or bars, according to aspects of the present disclosure.

FIG. 1D shows a perspective view the exemplary illumination apparatus 100 of FIG. 1C having configuration for projecting the rods 134b, 136b through the openings 134a and 136a, respectively, according to one or more aspects of the present disclosure. In one embodiment, the apparatus 100 is configured to project the rods 134b, 136b outward from inside of the housing 102 when a user presses the actuator 138. After the rods 134b, 136b projects through the openings 134a, 136a, the rods 134b, 136b may be locked into place and prevented from retracting back inside the housing 102. The rods 134b, 136b may be configured to retract back into the housing 102 through the openings 134a, 136a when the actuator 138 is pressed again. The pressing of the actuator 138 may release a locking mechanism coupled to the spring mechanism utilized for projecting the rods 134b, 136b. The locking mechanism and the spring mechanism are not shown in the figure for clarity of illustration. Any suitable mechanism configurable by one of ordinary skill in the art for projecting, locking, and retracting the rods 134b, 136b may be utilized. In one embodiment, the rods 134b, 136b may be released and projected out from the housing 102 via an electrical mechanism. For example, one or more switches or a combination of buttons or switches 108, 109, 110, 112a, 112b, 122a, 122b may be utilized to send an electrical signal to release the rods 134b, 136b upon actuation. For example, when the buttons 122a and 122b are pressed together simultaneously, an electrical signal may be generated to actuate a motor or spring mechanism inside of the housing 102 to release and project the rods 134b, 136b. Additionally, when the buttons 112a and 112b are pressed together simultaneously again, the rods 134b, 136b may retract back into the housing 102 via the openings 134a, 134b. In this embodiment, the actuator 138 may not be necessarily provided.

Figure 1E:
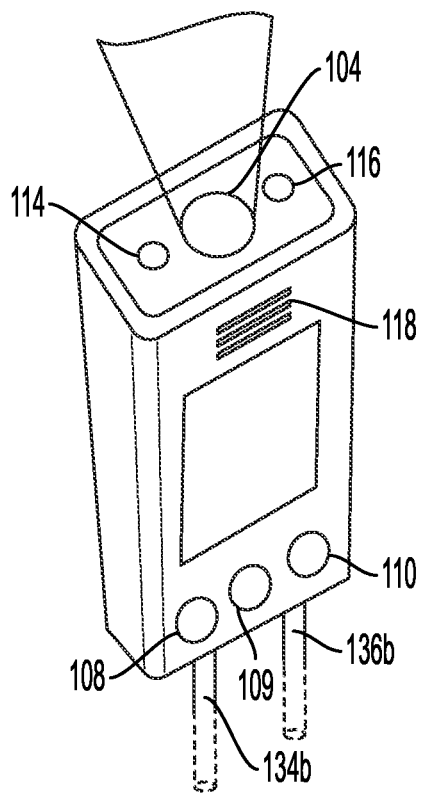
FIG. 1E illustrates a perspective view showing the exemplary illumination apparatus of FIGS. 1C-D having configuration for being secured on a surface, according to aspects of the present disclosure.

FIG. 1E shows a perspective view of the illumination apparatus 100 of FIGS. 1C-D having configuration for being secured on a surface, according to one or more aspects of the present disclosure. As shown in FIG. 1E, the apparatus 100 may be secured vertically on a surface (e.g., ground surface) to project illumination or light vertically upward into the sky or clouds. The apparatus 100 may be secured vertically at any suitable angle based on the manner or angle of inserting the rods 134b, 134b into the ground. The angle of the insertion of the rods 134a, 134b may be adjusted as desired by the user. For example, the locked rods 134b, 136b may be inserted into a surface by applying adequate downward pressure into the surface (e.g., dirt, rocks, pebbles, etc.). The rods 134b, 136b may contain spikes (not shown) that can facilitate the insertion into a surface. The spikes can be integrated as part of the rods or can be detachable spikes that can be attached when it is more convenient for inserting the rods into the surface. In one embodiment, the illumination generated by the apparatus 100 inserted into a surface may create a beam (e.g., white beam) of light projected into the sky or clouds. Such beam of light may serve as a beacon for signifying a location of the user. For example, if a hiker is lost or distressed in the woods at night, the vertical beam of light generated from the apparatus 100 that inserted into a surface may help guide a responder or helper to find the hiker that is lost. Additionally, the apparatus 100 may generate alarm or other sounds to serve as an audio beacon to further aid the responder or helper in finding the hiker that is lost or distressed.

Figure 1F:
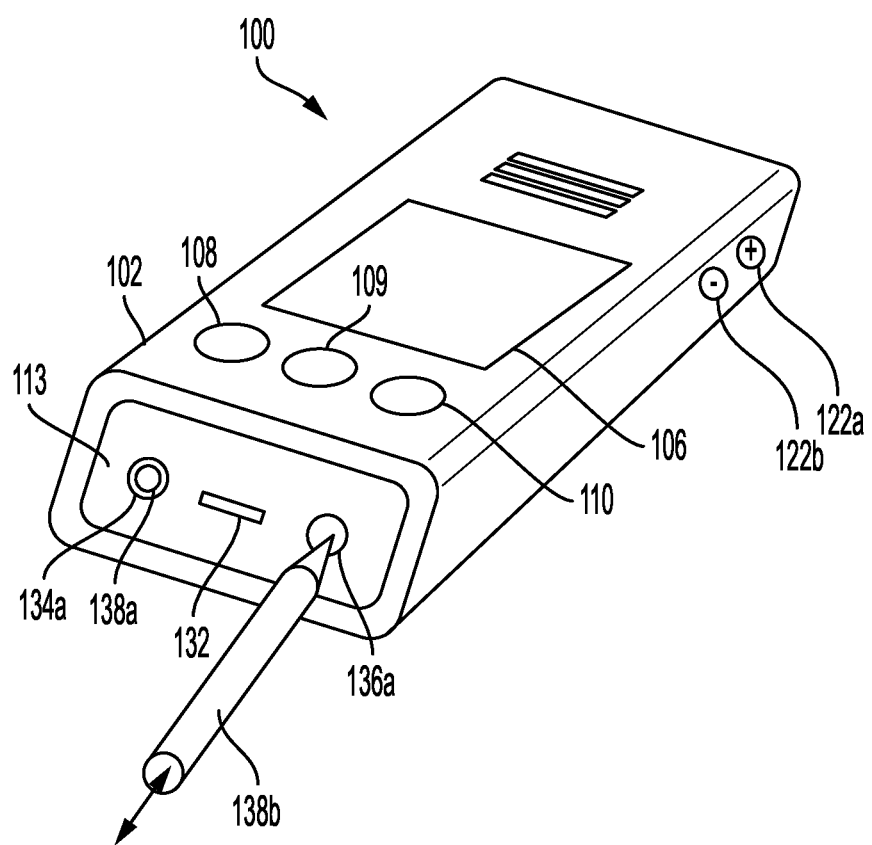
FIG. 1F illustrates a perspective view showing an exemplary illumination apparatus having configuration to store rods, bars or styluses, according to aspects of the present disclosure.

FIG. 1F shows a perspective view of the illumination apparatus 100 having configuration for storing rods or styluses 138a, 138b, according to one or more aspects of the present disclosure. The illumination apparatus 100 shown in FIG. 1F includes substantially similar characteristics as the apparatus 100 shown in FIG. 1C. Accordingly, explanations with respect to the substantially similar elements will be omitted for brevity. In this embodiment, the apparatus 100 may include stylus accommodating openings 134a and 136a. Styluses 138a and 138b may be disposed and secured inside of the housing 102 through the openings 134a and 136a, respectively. The styluses 138a, 138b may be made of metal, plastic, or other suitable material for facilitating input operations on the touchscreen input device 106. In one embodiment, the apparatus 100 may be configured to release the styluses 138a, 138b from a locking mechanism inside of the housing 102 and may project outward through the openings 134a, 136a when a user applies a predetermined amount of pressure (e.g., 0.1 to 0.5 psi, but not limited thereto) to the styluses 138a, 138b in a direction toward the inside of the housing 102. Once the styluses 138a, 138b are released, a user may slide out the styluses 138a, 138b through the openings 134a, 136a to use the styluses 138a, 138b for providing input to the touchscreen input device 106 or propping the apparatus 100 against the styluses 138a, 138b on a surface (e.g., ground). The styluses 138a, 138b may be inserted back into the housing 102 through the openings 134a, 136b by sliding the styluses 138a, 138b through the openings 134a, 134b. A user may apply a predetermined amount of pressure (e.g., 0.1 to 0.5 psi, but not limited thereto) to the styluses 138a, 138b in a direction toward the inside of the housing 102 to click and lock the styluses 138a, 138b back into the housing 102. The locking mechanism and/or the spring mechanism configured to release and lock the styluses 138a, 138b are not shown in this figure for clarity of illustration. Any suitable mechanism configurable by one of ordinary skill in the art for projecting, locking, and releasing the styluses 138a, 138b may be utilized. In one embodiment, the styluses 138a, 138b may be released and projected out from the housing 102 via an electrical mechanism. For example, one or more switches or a combination of buttons or switches 108, 109, 110, 112a, 112b, 122a, 122b may be utilized to send an electrical signal to release the styluses 138a, 138b upon actuation. For example, when the buttons 122a and 122b are pressed together simultaneously, an electrical signal may be generated to actuate a motor or spring mechanism inside of the housing 102 to release and project the styluses 138a, 138b.

Figure 1G:
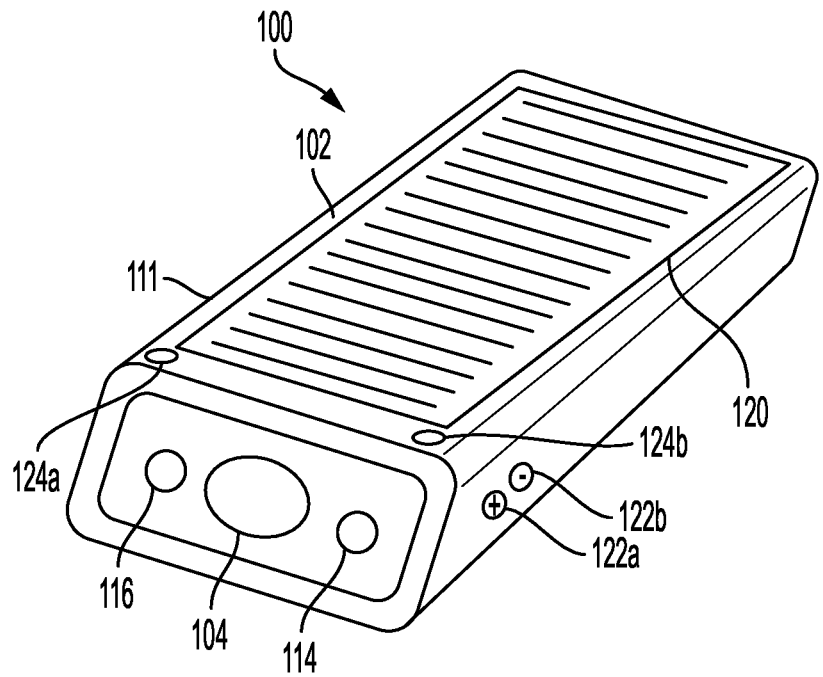
FIG. 1G illustrates a perspective view showing a side of the exemplary illumination apparatus of FIG. 1F having configuration with grooves for receiving rods, bars or styluses, according to aspects of the present disclosure.
Figure 1H:
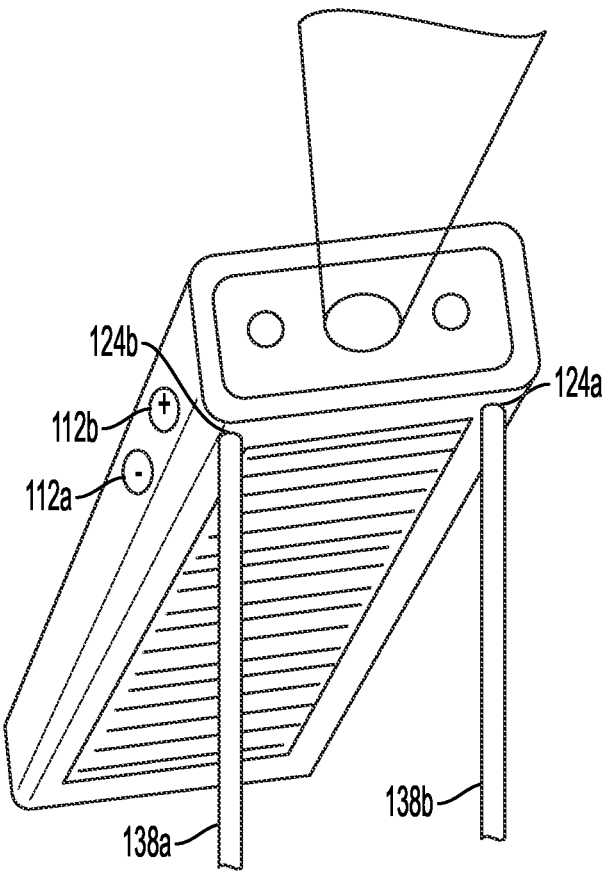
FIG. 1H illustrates a perspective view showing the exemplary illumination apparatus of FIGS. 1F-G having configuration for being secured on a surface, according to aspects of the present disclosure.

FIG. 1G shows another perspective view of the illumination apparatus 100 of FIG. 1F, according to one or more aspects of the present disclosure. The illumination apparatus 100 shown in FIG. 1G includes substantially similar characteristics as the apparatus 100 shown in FIG. 1B. Accordingly, explanations with respect to the substantially similar elements will be omitted for brevity. In this embodiment, the back surface 111 of the housing 102 of the apparatus 100 is shown. In this embodiment, the apparatus 100 may include grooves, indentations, or depressions 124a and 124b (hereinafter grooves 124a, 124b). The grooves 124a, 124b may be configured to mate with the styluses 138a, 138b for securing the apparatus 100 vertically at an angle on a surface. As shown in FIG. 1H, the styluses 138a, 138b may be inserted into a surface (e.g., ground). The apparatus 100 may then be propped against the styluses 138a, 138b by mating the grooves 124a, 124b with the ends of the styluses 138a, 138b, as shown in FIG. 1H. The grooves 124a, 124b may be shaped to match the ends of the styluses 138a, 138b to securely prop the apparatus 100 against the styluses 138a, 138b. As shown in FIG. 1H, the apparatus 100 may be secured vertically or at a suitable angle on a surface (e.g., ground surface) to project illumination or light substantially vertically upward into the sky, clouds, or a surface. The apparatus 100 may be secured vertically at any suitable angle based on the manner or angle of inserting the rods 138b, 138b into the ground. The angle of the insertion of the rods 138a, 138b may be adjusted as desired by the user. In one embodiment, the illumination generated by the apparatus 100 propped vertically on a surface may generation illumination in a beam, a pattern, a shape, or an image and may project the illumination into the sky, clouds, or a surface. Such illumination may serve as a beacon for signifying a location of the user. For example, if a hiker is lost or distressed in the woods at night, the illumination generated from the apparatus 100 may help guide a responder or helper to find the hiker that is lost. Additionally, the apparatus 100 may generate alarm or other sounds to serve as an audio beacon to further aid the responder or helper in finding the hiker that is lost or distressed. Alternatively, the apparatus 100 may project images or video onto a surface for entertainment purposes. For example, a camper may project images or videos onto a surface inside of a tent to view pictures or watching a movie. In this case, the apparatus 100 may function similarly to a portable projector.

Figure 1I:
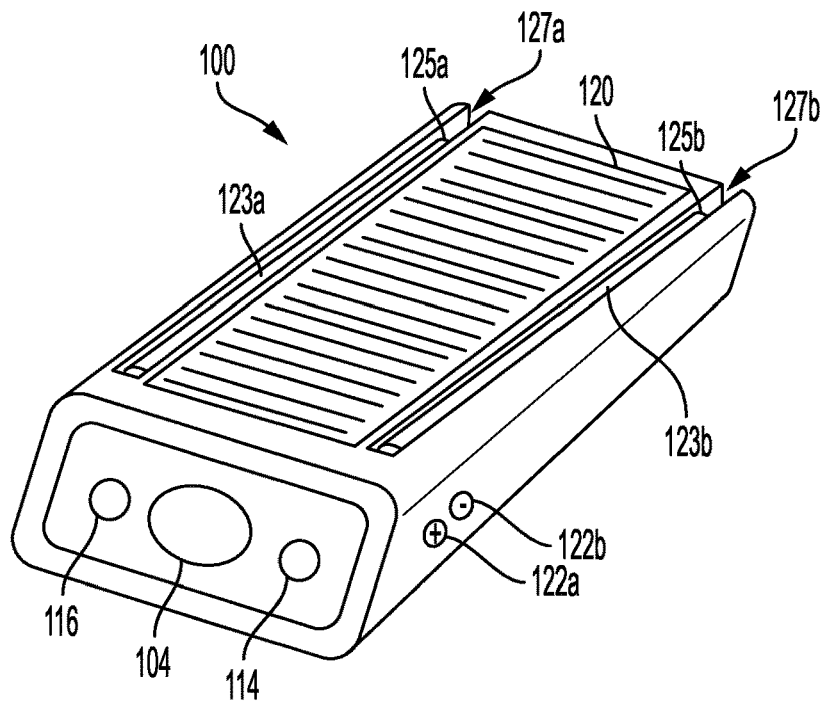
FIG. 1I illustrates a perspective view showing an exemplary illumination apparatus having configuration with channels for storing movable rods, bars, according to aspects of the present disclosure.
Figure 1J:
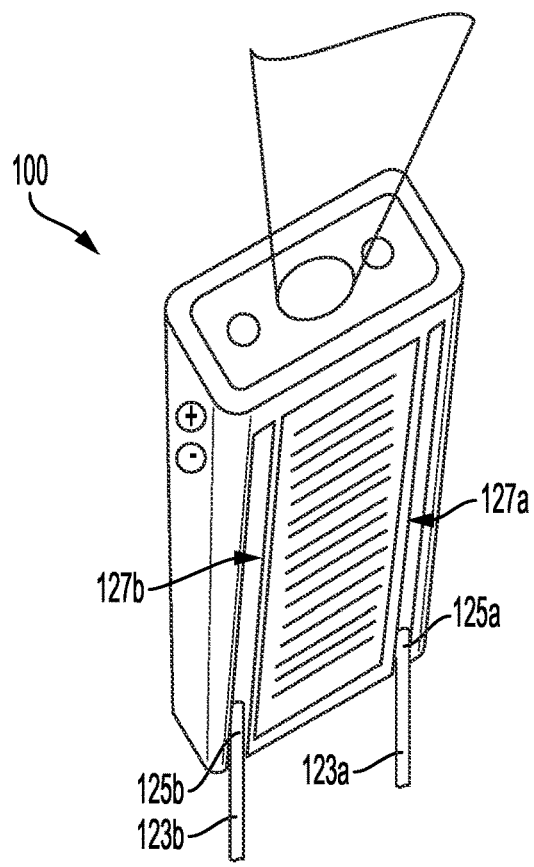
FIG. 1J illustrates a perspective view showing the exemplary illumination apparatus of FIG. 1I having configuration for being secured on a surface, according to aspects of the present disclosure.

FIG. 1I shows another perspective view of the illumination apparatus 100, according to one or more aspects of the present disclosure. The illumination apparatus 100 shown in FIG. 1I includes substantially similar characteristics as the apparatus 100 shown in FIG. 1B. Accordingly, explanations with respect to the substantially similar elements will be omitted for brevity. In this embodiment, the back surface 111 of the housing 102 of the apparatus 100 is shown. In this embodiment, the apparatus 100 may include channels 127a and 127b. The channels 127a, 127b may be configured to store rods or bars 123a, 123b (hereinafter rods 123a, 123b) for securing the apparatus 100 vertically or at an angle on a surface, as shown in FIGS. 1I and 1J. The apparatus 100 may include rotating mechanisms 125a, 125b to facilitate rotation of the rods 123a, 123b. For example, the rotating mechanisms 125a, 125b may include metal bars that go through the rods 123a, 123b. Accordingly, the rods 123a, 123b may be rotated about the axes of the metal bars. The metal bars are not shown in these figures for clarity of illustration. The rotating mechanisms 125a, 125b may be any other suitable mechanisms known by one of ordinary skill in the art to facilitate rotation of the rods 123a, 123b.

Referring to FIG. 1J, the rods 123a, 123b may be rotated about the rotating mechanisms 125a, 125b to project the rods 123a, 123b from the bottom surface 113 (bottom surface not shown for clarity of illustration). The rotating mechanism 125a, 125b may be configured to lock the rods 123a, 123b when fully rotated, as shown in FIG. 1J. Additionally, the rotating mechanisms 125a, 125b, may be configured to lock the rods 123a, 123b at a predetermine rotation angle. For example, the rods 123a, 123b may be locked (e.g., via a click locking mechanism) at every 15 degrees of rotation, but is not limited thereto. In one embodiment, the apparatus 100 may be inserted into a surface (e.g., ground) when the rods 123a, 123b are fully rotated and locked into place with the rods 123a, 123b extending out from the bottom surface 113, as shown in FIG. 1J. As shown in FIG. 1J, the apparatus 100 may be secured vertically on a surface (e.g., ground surface) to project illumination or light vertically upward into the sky or clouds. For example, the locked rods 123a, 123b may be inserted into a surface by applying adequate downward pressure into the surface (e.g., dirt, rocks, pebbles, etc.). The rods 125a, 125b may contain spikes (not shown) that can facilitate the insertion into a surface. The spikes can be integrated as part of the rods or can be detachable spikes that can be attached when it is more convenient for inserting the rods into the surface. In one embodiment, the illumination generated by the apparatus 100 inserted into a surface may create a beam (e.g., white beam) of light projected into the sky or clouds. Such beam of light may serve as a beacon for signifying a location of the user. For example, if a hiker is lost or distressed in the woods at night, the vertical beam of light generated from the apparatus 100 that inserted into a surface may help guide a responder or helper to find the hiker that is lost. Additionally, the apparatus 100 may generate alarm or other sounds to serve as an audio beacon to further aid the responder or helper in finding the hiker that is lost or distressed.

Additionally or alternatively, the apparatus 100 may be secured on a surface (e.g., ground surface) vertically at an angle (e.g., 150 degrees) to project illumination or light vertically upward into the sky, clouds, or a surface. In this embodiment, the angle of the apparatus 100 may be adjusted to a desired angle of the user. The illumination generated by the apparatus 100 secured on the surface may generate illumination in a form of a beam, a pattern, a shape, or an image and may project the illumination into the sky, clouds, or a surface. Such illumination may serve as a beacon for signifying a location of the user. For example, if a hiker is lost or distressed in the woods at night, the illumination generated from the apparatus 100 may help guide a responder or helper to find the hiker that is lost. Additionally, the apparatus 100 may generate alarm or other sounds to serve as an audio beacon to further aid the responder or helper in finding the hiker that is lost or distressed. Alternatively, the apparatus 100 may project images or video onto a surface for entertainment purposes. For example, a camper may project images or videos onto a surface inside of a tent to view pictures or watching a movie. In this case, the apparatus 100 may function similarly to a portable projector.

Figure 2:
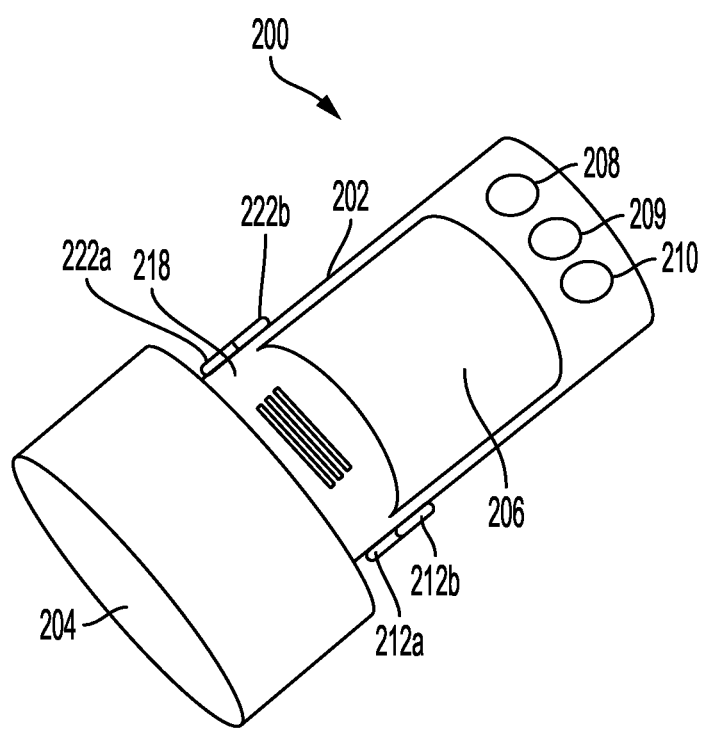
FIG. 2 illustrates a perspective view showing an exemplary illumination apparatus, according to aspects of the present disclosure.

FIG. 2 shows a perspective view of an exemplary illumination apparatus 200, according to one or more aspects of the present disclosure. The illumination apparatus 200 may be a flashlight or any other suitable light generating device configured to operate in accordance with one or more embodiments of the present disclosure. The illumination apparatus 200 may include a housing 202 and a touchscreen input device 206 on a front surface 203 of the housing 202, as shown in FIG. 2. The housing 202 may be water resistant or waterproof. One or more means may be employed to seal the housing 202 to prevent water from entering the inside of the housing 202. The one or more means may be rubber, sealant, adhesive, or any other suitable material applied at joints or other areas of the housing 202 to provide water resistant or waterproof characteristics to the apparatus 200. The illumination apparatus 200 may also include a light emitting device 204 disposed at the proximal end of the housing 202, and a battery (not shown in this figure for clarity of illustration) inside of the housing 202 configured to provide sufficient electrical power to the light emitting device 204. In the present disclosure, the battery may provide sufficient power to all components of the apparatus 200 requiring electrical power. In one embodiment, the battery may be a rechargeable battery, but is not limited thereto. The illumination apparatus 200 may also include a plurality of control buttons 208, 209, 210 on the front surface 203 near a distal end of the housing 202, and a microphone/speaker unit 218 on the front surface 203 near the proximal end of the housing 202. However, the locations of the control buttons 208, 209, 210 are not limited thereto. In this disclosure, the term button and switch are used interchangeably. The illumination apparatus 200 may also include intensity control buttons 212a, 212b on a first side near the proximal end of the housing 202, as shown in FIG. 2, but the location of the intensity control buttons 212a, 212b is not limited thereto. The illumination apparatus 200 may also include beam control buttons 222a, 222b on a second side near the proximal end of the housing 202, as shown in FIG. 2, but the location of the beam control buttons 222a, 222b is not limited thereto. In the present disclosure the control buttons 208, 209, 210, 212a, 212b, 222a, and/or 222b may be mechanically actuated or electrically actuated. For example, the control buttons 208, 209, 210, 212a, 212b, 222a, and/or 222b may include spring loaded mechanism to impart tactile feedback to the user when pressed. Alternatively, the control buttons 208, 209, 210, 212a, 212b, 222a, and/or 222b may include capacitive or resistive touch sensors and/or piezoelectric switches. Additionally, the control buttons 208, 209, 210, 212a, 212b, 222a, and/or 222b may include integrated haptic or vibration generators to impart haptic signals or vibrations upon activation.

The apparatus 200 shown in FIG. 2 includes characteristics that are substantially similar to the apparatus 100 shown in FIGS. 1A and 1B. Accordingly, the apparatus 200 may include a solar panel (not shown in FIG. 2 for clarity of illustration) on a surface opposite the touchscreen input device 206. In this embodiment, the apparatus 200 includes a cylindrical shape. Accordingly, the touch screen input device 206 may comprise a flexible or a curved capacitive or resistive sensor integrated with a flexible or curved liquid crystal display, organic LED (OLED), electrophoretic display, or any other suitable display.

Figure 3:
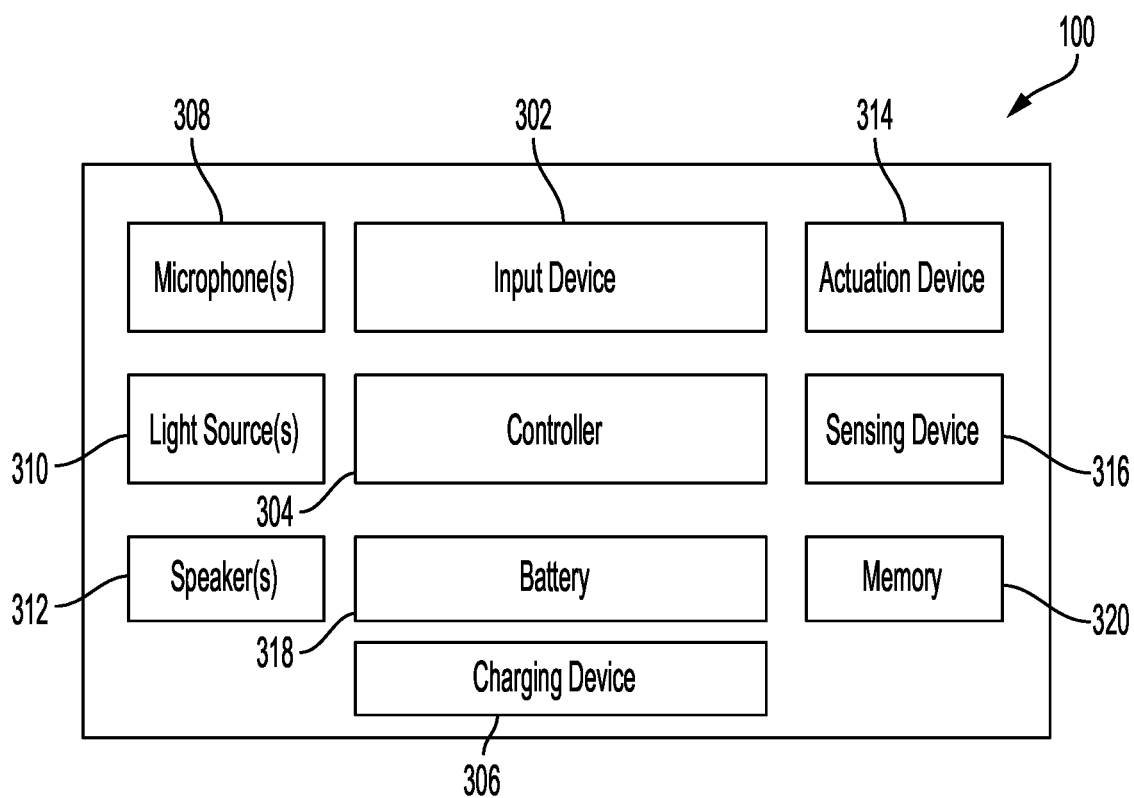
FIG. 3 illustrates components of an exemplary illumination system, according to aspects of the present disclosure.

FIG. 3 shows an exemplary illumination system 300, according to one or more aspects of the present disclosure. The system 300 may facilitate operation of the apparatus 100 or 200 disclosed in connection with FIGS. 1A-2 according to embodiments of the present disclosure by utilizing one or more components shown in FIG. 3. The system 300, as well as the processes, methods, and functionality performed by the system 300, solve the technological problems arising in the conventional flashlight technology. That is, the system 300, processes, and methods of the present disclosure described herein are directed to an improvement in the conventional flashlight field and are practically applicable to the field of multifunctional interactive illumination apparatus by utilizing the illumination apparatus 100 or 200, as well as the methods, processes and functionality disclosed in connections with FIGS. 1A-7 of the present disclosure.

In one embodiment, the illumination system 300 may comprise an input device 302, light source(s) 310 and a battery 318. The input device 302 may comprise the touchscreen device 106 disclosed in connection with one or more embodiments of FIGS. 1A-7, or any other suitable input means for receiving input from a user. The light source(s) 310 may comprise the light emitting devices 104, 112, 116 disclosed in connection with one or more embodiments of FIGS. 1A-7. The battery 318 may comprise a battery inside of the apparatus 100 or 200 to provide sufficient power to the various components of the system 300. Alternatively, the battery 318 may comprise an external battery configured provide sufficient power to the various components of the system 300, as well as charging an internal battery of the system 300. The system 300 may also comprise a charging device 306. The charging device may comprise the solar panel 120 or other external charging device (e.g., external battery).

In one embodiment, the system 300 may include actuation device(s) 314. The actuation device(s) 314 may comprise the control buttons 208, 209, 210, 212a, 212b, 222a, and/or 222b disclosed in connection with one or more embodiments of FIGS. 1A-7 to facilitate generation of user input signals for performing one or more functionalities of the apparatus 100 or 200. Additionally, the actuation device(s) 314 may comprise integrated haptic or vibration generators to impart haptic signals or vibrations upon activation in connection with embodiments of the present disclosure. The system 300 may also include a microphone(s) 308 and a speaker(s) 312. The microphone(s) 308 and the speaker(s) 312 may be separate components or may be provided as an integrated single component. The microphone(s) 308 and the speaker(s) 312 may comprise the microphone/speaker device 108 disclosed in connection with one or more embodiments of FIGS. 1A-7 to facilitate generation of audio signals based on a user voice input and/or to generation alarm or other sounds according to various functionality disclosed in the present disclosure.

In one embodiment, the system may include a sending device(s) 316. Although not shown in the apparatus 100 or 200 shown in connection with FIGS. 1A-7, the sending device(s) 316 may be disposed within the housing 102 or 202 of the apparatus 100 or 200 to perform various functions relating to the sending device(s) 316 in connection with embodiments of the present disclosure. In one embodiment, the sensing device(s) 316 may comprise one or more sensors (e.g., accelerometer) to determine a relative position of the apparatus 100 or 200 (e.g. three coordinates) as well as a relative orientation of the apparatus 100 or 200 (e.g., three angles) with regard to the user. This tracking information may amount to 6 degrees of freedom for the apparatus 100 or 200 that may determine how the illumination may be generated (later described in further detail in FIG. 6B). The sensing device(s) 316 may also comprise a GPS and a digital compass sensor configured to detect the direction and magnitude of external magnetic fields.

In one embodiment, the system a controller 304 and a memory 320 to facilitate the operation of the system 300 and/or apparatus 100 or 200 in accordance with the present disclosure. In one embodiment, the controller 304 may comprises a computer processing unit or system (e.g., processor). Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities. In a similar manner, the term "processor" may refer to any device or portion of a device that processes electronic data, e.g., from registers and/or memory 320 to transform that electronic data into other electronic data that, e.g., may be stored in registers and/or memory. The controller 304 may include one or more processors. For example, the controller 304 may comprise a central processing unit (CPU), a graphics processing unit (GPU), or both. The controller 302 may comprise one or more general processors, digital signal processors, application specific integrated circuits, field programmable gate arrays, digital circuits, analog circuits, combinations thereof, or other now known or later developed devices for analyzing and processing data. The controller 302 may implement a software program, such as code generated manually (i.e., programmed). Additionally, the controller 302 may be configured facilitate cellular and/or satellite wireless communication.

In one embodiment, the memory 320 may store a set of instructions that can be executed to cause the controller 302 to perform any one or more of the methods or processes based on functionality disclosed in the present disclosure. The memory 320 may communicate via one or more electrical wires or buses. Likewise, although not shown, the components shown in FIG. 3 may be coupled to each other via one or more electrical wires and buses, in any suitable manner known by one of ordinary skill in the art, to facilitate signal or data communication and operation of the system 300, in accordance with the present disclosure. The memory 320 may be a main memory, a static memory, or a dynamic memory. The memory 320 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, and the like. In one implementation, the memory 320 may include a cache or random-access memory for the controller 304. The memory 320 may be a cache memory of a processor, the system memory, or other memory. The memory 704 may be operable to store instructions executable by the controller 304. The functions, acts or tasks illustrated in the figures or described herein may be performed by the controller 302 executing the instructions stored in the memory 320. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, light source control, and the like. The computer readable storage media described in connection with the memory 320 in accordance with the present disclosure may be non-transitory, and may be tangible.

The illumination apparatus 100 or 200, and system 300 disclosed in connection with embodiments of FIGS. 1A-7 and the various elements therein comprised, which enable the implementation of methods and processes in accordance with the present disclosure, may be implemented by the controller 304 using a plurality of microprocessors executing software or firmware, or may be implemented using one or more application specific integrated circuits (ASICs) and related software. In other examples, the system 300 and the various elements therein comprised, which enable the implementation of methods and processes in connection with embodiments of FIGS. 1A-7, may be implemented using a combination of ASICs, discrete electronic components (e.g., transistors), and microprocessors. In some embodiments, components shown as separate may be replaced by a single component. In addition, some of the components displayed may be additional, or may be replaced by other components.

Computer-readable media having stored thereon instructions configured to cause one or more computers to perform any of the methods described herein are also described. A computer readable medium may include volatile or nonvolatile, removable or nonremovable media implemented in any method or technology capable of storing information, such as computer readable instructions, data structures, program modules, or other data. In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

Figure 4A:
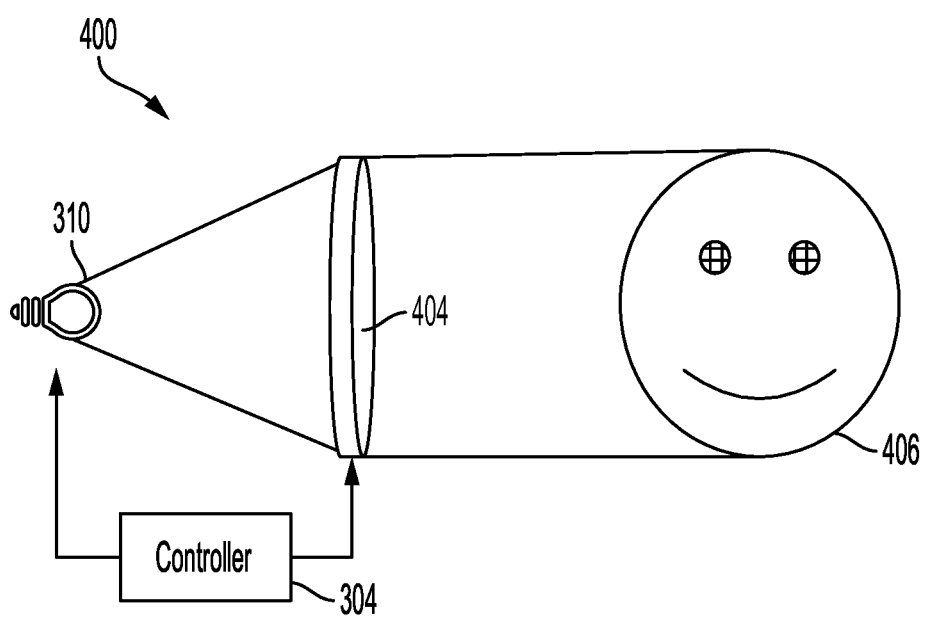
FIG. 4A illustrates a block diagram of an exemplary illumination control system, according to aspects of the present disclosure.

FIG. 4A shows a block diagram of an exemplary illumination generation system 400, according to one or more aspects of the present disclosure. The illumination control system 400 may include a light source(s) 310 and a light mask 404. Additionally, the system 400 may include the controller 304 to control the light source(s) 310 and the light mask 404 in accordance with embodiments of the present disclosure. For example, the controller 304 may receive one or more instructions from the memory 320 or other components of the system 300 or apparatus 100 or 200 to generate illumination. Upon receipt of the one or more instructions, the controller 304 may generate signals to control, for example, intensity and duration of light generated from the light source(s) 310 to be projected to the mask 404. The controller 304 may control the mask 404, for example, synchronously or asynchronously to generate desired illumination 406. The illumination 406 may include, for example, a beam of light in various shapes including, but not limited to, a conical shape. Further, the illumination 406 may include other patterns or shapes of light including, for example, text, image, video, etc. in one or more colors.

In one embodiment, the controller 304 may be configured to control the mask 404 to operate synchronously or asynchronously with the input device 302. For example, when the input device 302 (e.g., touchscreen input device 106 or 206) has a blank screen (e.g., white or any other suitable color), the mask 404 may be substantially transparent so as to allow majority of the light generated by the light source(s) 310 to pass through the mask 404 to generate, for example, a white or other desired solid color light or illumination. Alternatively, when the touchscreen input device 106 or 206 detects a writing or drawing input on the touchscreen, one or more pixels on the mask 404 may be masked or shadowed to generate the illumination 406 comprising the writing or drawing. As described in the foregoing disclosure, the light source(s) 310 may include one or more LEDs or LEPs (later described in detail in FIGS. 4A and 4B). In one embodiment, the mask 404 may comprise a liquid crystal panel (e.g., transparent liquid crystal panel) that may be controlled by the controller 304 to change the opacity of the pixels of the liquid crystal panel to generate a desired illumination in the form of a grayscale (or black and white) or color image, video, shape, text, etc. Alternatively, the mask 404 may comprise an electrophoretic panel (e.g., transparent E-ink display panel) that may be controlled by the controller 304 to generate a desired illumination in the form of a grayscale (or black and white) or color image, video, shape, text, etc. Alternatively, the mask 404 may include powder in each of the pixels of the mask that may be movable when a magnetic signal is applied. Accordingly, the controller 204 may control magnetic signals to cover one or more pixels of the mask with powder (e.g., metallic black powder) to generated desired illumination.

Figure 4C:
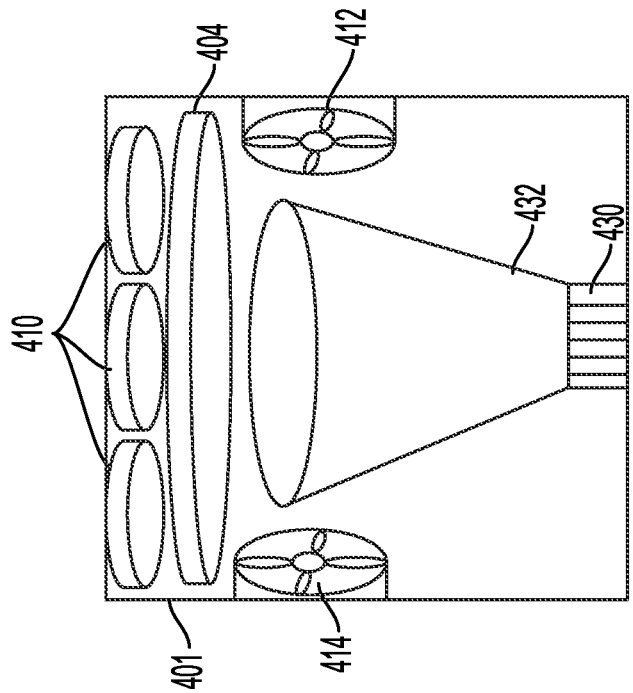
FIG. 4C illustrates a block diagram of another exemplary illumination generating system, according to aspects of the present disclosure.
Figure 4B:
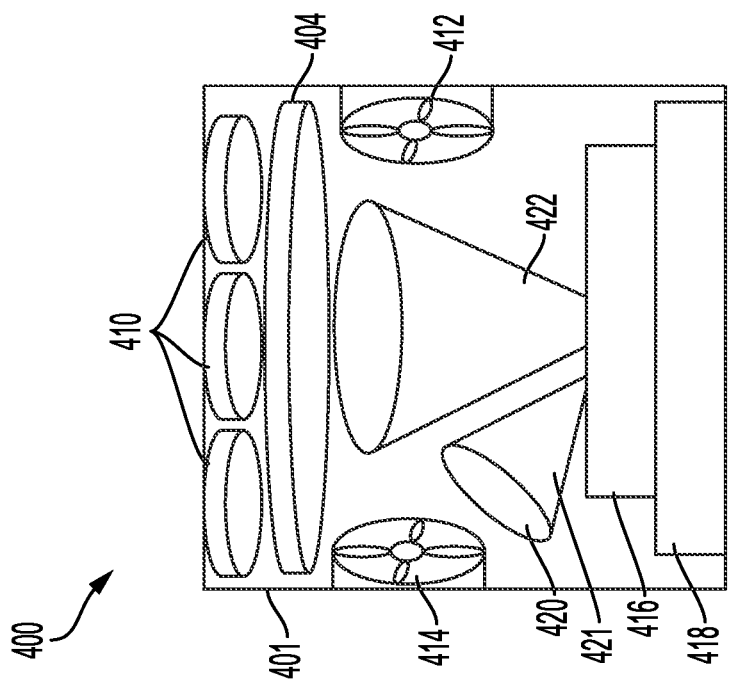
FIG. 4B illustrates a block diagram of an exemplary illumination generating system, according to aspects of the present disclosure.

FIG. 4B shows a block diagram of the illumination generation system 400, according to one or more aspects of the present disclosure. In this embodiment, the illumination generation system 400 may be include a LEP light source. For example, the illumination generation system may include a phosphor element 416 and a metal element 418. Although not shown in this figure, the system 400 may comprise the controller 304 connected to one or more components in the system 400 to facilitate generation of light or illumination. For example, the controller 304 may be configured to facilitate generation of blue laser beam 421 (the blue laser and the blue laser beam on the opposite side of the lens 420 is not shown in this figure for clarity of illustration) that may be focused by a lens 420 to excite the phosphor element 416 to generate visible light 422 that may be focused via lenses 410 to focus the light that is distinctively bright white and long-reaching LEP beam. In another embodiment, the lenses 410 may be arranged between the mask 404 and the phosphor element 416 instead of being in front of the mask 404, as shown in FIG. 4B. The system 400 employing an LEP, as described above, may generate highly concentrated beam with high luminosity and a long-range beam reaching over a mile. Accordingly, the system 400 may be useful for camping in the wilderness, exploring caves, or working in low-light conditions or for creating a beam of light projected into the sky or clouds. Such beam of light may serve as a beacon for signifying a location of a hiker who may be lost.

In one embodiment, the lenses 410 may be controlled to amplify brightness or change the field of projection of the light beam. For example, when the switches 112a, 112b, 122a, and/or 122b are pressed, the controller 404 may generate signals to control the angle and position of one or more of the lenses 410 to modify the intensity of the brightness or the field of projection (e.g., change the width or focus of the beam).

In one embodiment, the system 400 may include ventilators 412, 414 to cool down the heat generated by the laser and the phosphor element 416 of the system 400. The location of the ventilators 412, 414, as shown in FIG. 4B, are not limited thereto.

FIG. 4C shows a block diagram of the illumination generation system 400, according to one or more aspects of the present disclosure. In this embodiment, the system 400 may include a plurality of LEDs 430. The intensity of the light 432 generated by the LEDs 430 may be multiplied based on the number of LEDs 430 provided. The LEDs 430 may comprise white and/or color LEDs to generate light 432. The system 400 may include components that are substantially similar to the system 400 shown in FIG. 4B, and the light 432 generated by the LEDs 430 may be controlled to amplify the brightness or change the field of projection (e.g., change the width or focus of the beam) substantially similar to the system 400 shown in FIG. 4B. Accordingly, explanations with respect to the substantially similar elements will be omitted for brevity.

The system 400 shown in 4B and 4C employ LEDs and LEPs. However, in one embodiment, the system 400 may comprise, additionally or alternatively, a suitable light emitting device used in a portable projector device. Accordingly, the illumination system 400 or apparatus 100 or 200 may also function as a portable projector to display images and video.

Figure 5C:
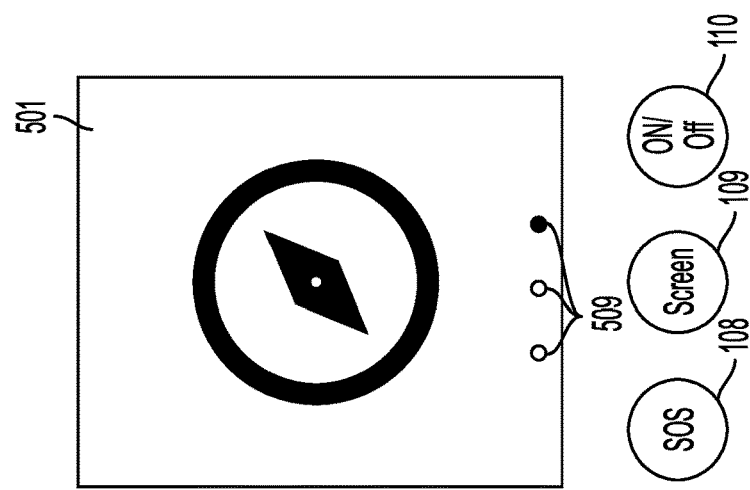
FIG. 5C illustrates a block diagram of an exemplary user interface of an illumination apparatus including a digital compass, according to aspects of the present disclosure.
Figure 5B:
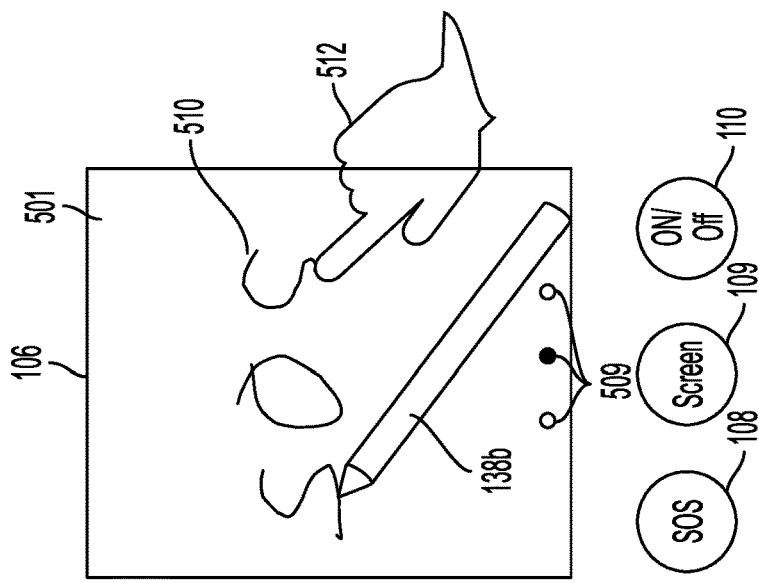
FIG. 5B illustrates a block diagram of an exemplary user interface of an illumination apparatus including a touch input area, according to aspects of the present disclosure.
Figure 5A:
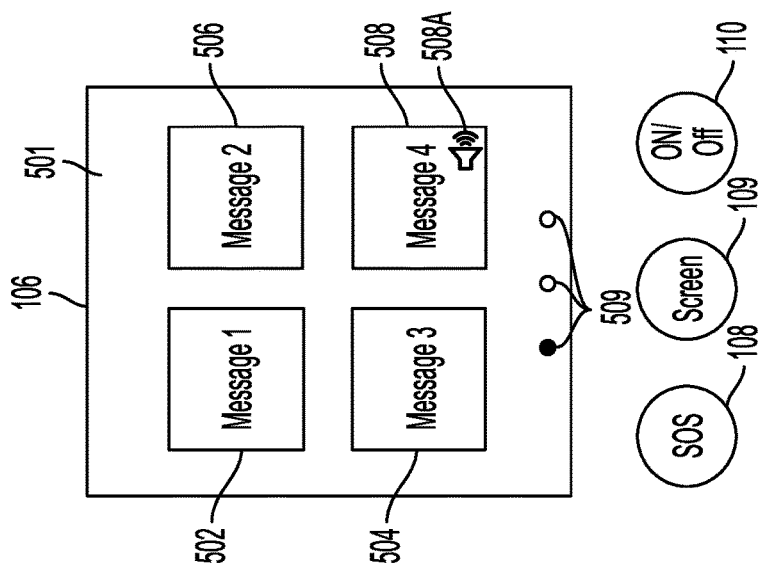
FIG. 5A illustrates a block diagram of an exemplary user interface of an illumination apparatus including graphical touch elements, according to aspects of the present disclosure.

FIGS. 5A-C illustrate block diagrams showing the touchscreen input device 106 and the switches 108, 109, and 110 of the apparatus 100 or 200 or system 300 (the touchscreen input device and the switches are numbered in reference to apparatus 100 for clarity of illustration and explanation) disclosed in connection with embodiments of the FIGS. 1A-7. FIGS. 5A-C show the user interface 501 including a plurality of graphical dots 509 indicating the status of the user interface 501. For example, when the first dot of the plurality of dots 509 is solid, the user interface 501 may be in a mode or page as shown in FIG. 5A, when the second dot is solid, the user interface 501 may be in a mode or page as shown in FIG. 5B, and when the third dot is solid, the user interface 501 may be in a mode or page as shown in FIG. 5C. The mode or the page of the user interface 501 may be switched by swiping the screen of the input device 106 with one or more fingers or a stylus. For example, when a user swipes the touchscreen with one or more fingers from a right side of the touchscreen to the left side of the screen, the mode or page of the user interface 501 may change from the interface 501 shown in FIG. 5A to the interface 501 shown in FIG. 5B. When the interface 501 shown in FIG. 5A changes to the interface shown in FIG. 5B, the first dot of the plurality of dots 509 will change from solid to empty, and the second dot will change from empty to solid, as shown in FIG. 5B. When the user swipes one or more fingers across the touchscreen again from the right side of the touchscreen to the left side of the screen, the mode or page of the user interface 501 may change from the interface 501 shown in FIG. 5B to the interface 501 shown in FIG. 5C. Also, when the interface 501 shown in FIG. 5B changes to the interface shown in FIG. 5C, the second dot of the plurality of dots 509 will change from solid to empty, and the third dot will change from empty to solid, as shown in FIG. 5B. If the user swipes the touchscreen in the reverse direction, the user interface 501 will change from the interface shown in FIG. 5C to the interface shown in FIG. 5B, and then from the interface shown in FIG. 5B to the interface shown in FIG. 5A. The dots 509 will change from solid to empty similarly, but in reverse direction.

Figure 6A:
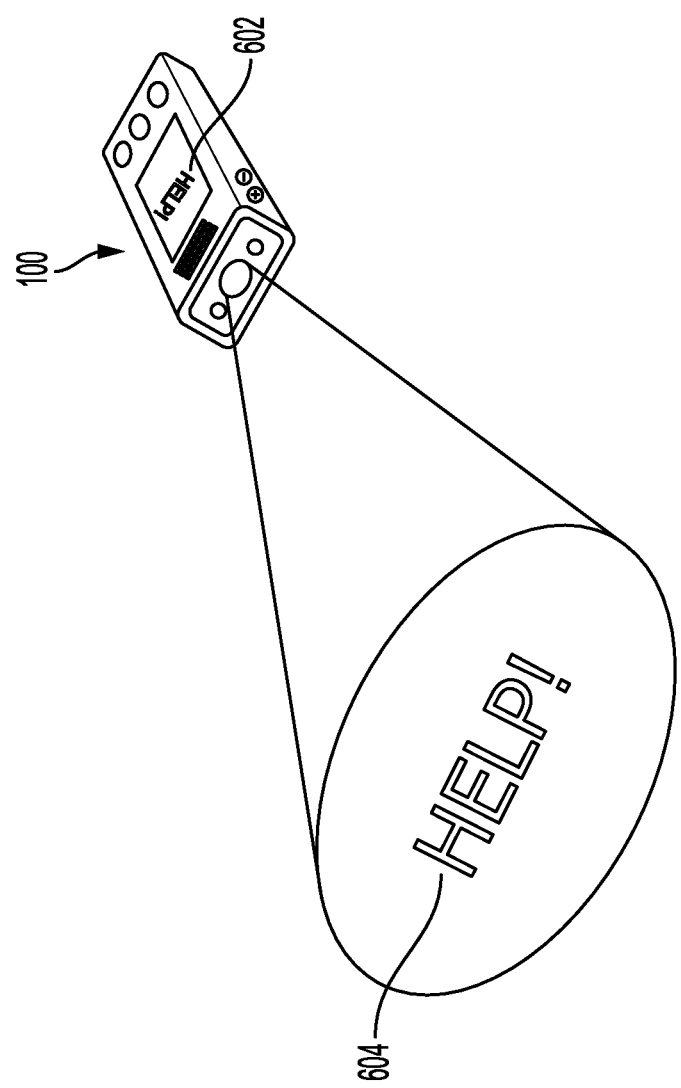
FIG. 6A illustrates a perspective view showing an exemplary illumination apparatus projecting a message based on a user input, according to aspects of the present disclosure.

FIG. 5A shows the user interface 501 in a mode or page including a plurality of graphical elements 502-508. The graphical elements 502-508 may be programmed to actuate one or more functionalities of the apparatus 100 or 200 or system 300 disclosed in connection with embodiments of the FIGS. 1A-7. For example, the graphical element 502 may be programmed so that when a user touches the element 502, the apparatus 100 or 200 or system 300 may generate illumination including a first message (e.g., "Help!"). As shown in FIG. 6A, the apparatus 100 may project an illumination including a message 604 including the first message (e.g., "Help!."). In one embodiment, after pressing the element 502, the touchscreen input device 106 may also display a message 602 (e.g., "Help!"), as shown in FIG. 6A. Of course, the elements 502-508 may be programmed with any message the user desires. Further, the elements 502-508 are referred herein by using ordinal numbers such as "first", "second", and the like, to distinguish one from another, but they are not intended to limit the position and/or functionality by the terms, as with any other elements described using such naming convention in this disclosure.

In one embodiment, element 508 may include an icon 508A (e.g., a speaker icon). The icon 508A may indicate that an alarm or a sound corresponding to the programmed message of the element 508 may be generated when activated. Accordingly, when a user touches the element 508, the apparatus 100 or 200 or system 300 may generate, for example, an illumination including a fourth message (e.g., "S.O.S.") and an alarm or siren to alert a responder or helper in the vicinity of the user. In one embodiment, the alarm, siren, or other sounds may be loud enough to be heard, for example, within at least a 20-meter radius, but is not limited thereto. Accordingly, the responder or helper may locate the user by following not only the illumination with the message, but also the alarm, siren, or other sounds. Accordingly, the illumination and the sounds generated by apparatus 100 or 200 or system 300 may function as a beacon for locating the user.

FIG. 5B shows the user interface 501 in a mode or page configured to receive touch or gesture input from a user via one or more fingers or a stylus. In this embodiment, a user may write messages or draw figures or shapes. For example, the messages, figures, or shapes written or drawn on the touchscreen input device 106 may be generated in the form of illumination by the apparatus 100 as shown in FIG. 6A. In this example, a user may write "Help!" 602 on the touchscreen input device 106, and the message 602 may be synchronously (e.g., real time) or asynchronously displayed in the illumination 604. In one embodiment, the interface 501 may include one or more graphical icon (e.g., enter) that can be activated by a user to confirm displaying the message in the illumination 604. In this case, the message, shape, or figure drawn on the touchscreen input device 106 may be displayed asynchronously in the illumination 604. In one embodiment, the touchscreen input device 106 may comprise a color touchscreen. Accordingly, any color drawing produced on the touchscreen input device 106 by the user may be synchronized with the light emitting devices to generate color illumination that replicates the color drawing produced by the user. Accordingly, when the illumination is projected synchronously in real time, a dynamic projection of the illumination may be facilitated by the apparatus 100. Conversely, when the illumination is projected asynchronously, as described above, a static projection of the illumination may be facilitated by the apparatus 100. For example, in the dynamic projection mode, the apparatus 100 may project illumination similarly to the roman candle fireworks where you write your name in the air, but instead with the apparatus 100. One or more dynamic shape, pattern, images, text, etc. may be stored in the memory 320 and reproduced later when activated via the apparatus 100. The apparatus 100 may be activated by selecting an image or text provided by the user interface, or may be selected through a voice input. Additionally, the user interface may include a text editor. Accordingly, a selected or drawn images or text may be further styled or embellished through the user interface (e.g., some letters may be one highlighted, bolded, added italics, colored, or may blink while other are not). The dynamic shape or pattern may be projected or display one or repeated in loops. These functionalities may entertainment purposes, but may also serve for business purposes, such as projecting or display ads via the illumination generated by the apparatus 100 (e.g., dynamically writing or projecting text or an image of Coca Cola in the sky). Additionally or alternatively, in the dynamic projection mode, a sound output may be synchronized with illumination generated by the apparatus 100. For example, sound may be added to the dynamic projection as the apparatus 100 projects or draws an image or text in air via illumination.

FIG. 5C shows the user interface 501 in a digital compass mode. A user may utilize the digital compass mode to find directions if necessary. The apparatus may utilize the sensing device(s) 316 comprising a GPS and a digital compass sensor configured to detect the direction and magnitude of external magnetic fields. When the apparatus 100 is pointed at different directions, the graphical needle on the digital compass shown in FIG. 5C may change its direction. In one embodiment, a user may pair a smartphone application to the apparatus 100 or 200 or system 300 via a Bluetooth communication, and may use the smartphone application to share content (e.g., a picture, a text, drawings, etc.), remotely activate an emergency signal and/or check for positions of using hikers. For example, a smartphone application that is pairable with the apparatus 100 may be used by other users such as hikers. The application may be accessed through the touchscreen input device 106 once paired. Once paired, the application from the smartphone may share content with the apparatus 100 for projecting illumination and/or sound. Further, the apparatus 100 may activate an emergency signal that could be triggered through the user interface shown, for example, in FIG. 5A. Alternatively, the apparatus 100 may show a map with GPS coordinate showing positions of other hikers that are also using the smartphone application so that if the user may look for other when lost. Additionally, the application may access a social network for hikers that may allow communication with each other (e.g., via the user interface shown on the apparatus 100 or the smartphone).

As described above, FIG. 6A shows a perspective of the illumination apparatus 100 projecting a message based on a user input, according to aspects of the present disclosure.

Figure 6B:
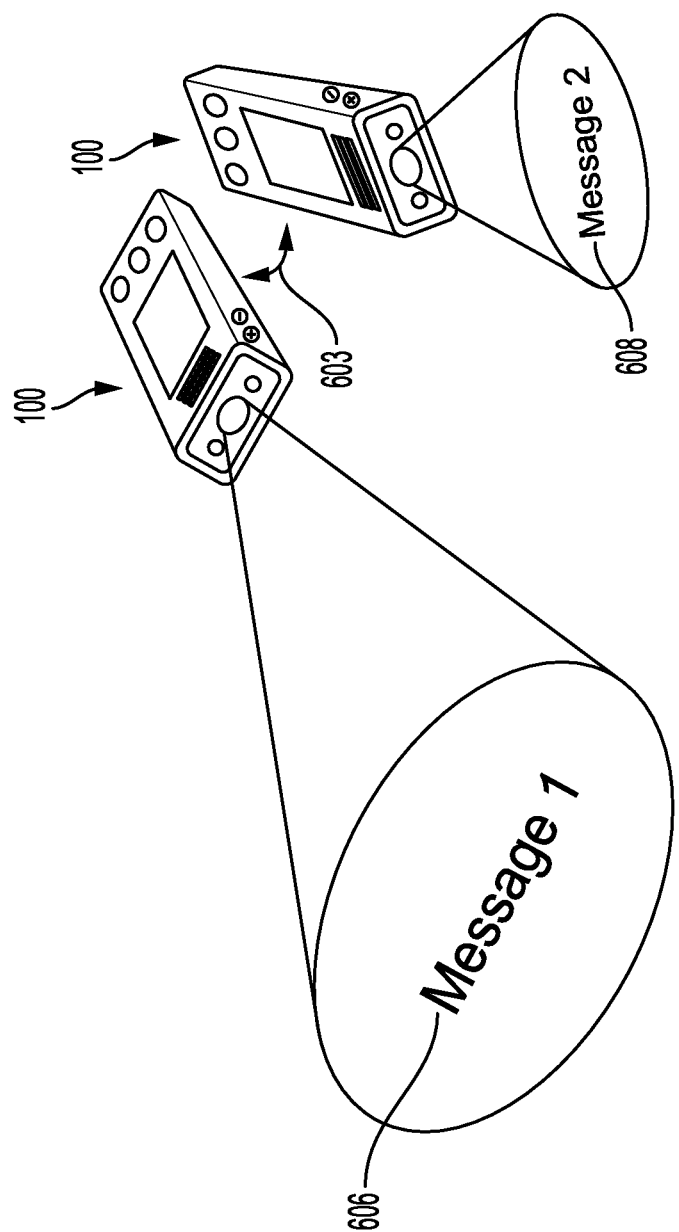
FIG. 6B illustrates a perspective view showing an exemplary illumination apparatus projecting messages based an orientation change, according to aspects of the present disclosure.

FIG. 6B shows a perspective view of the illumination apparatus 100 projecting messages based on changes in orientation or position of the apparatus 100, according to aspects of the present disclosure. In one embodiment, the apparatus 100 or 200 or system 300 may generate different messages when, for example, the orientation or position of apparatus 100 is changed while the light or illumination from the apparatus 100 is being generated. For example, the apparatus 100 may generate illumination 606 comprising a first message (or shape, image, etc.) in accordance with embodiments corresponding to FIGS. 1A-7. The illumination 606 may be change to illumination 608 comprising a second message when the apparatus 100 changes its orientation or position, for example, as indicated by an arrow 608 shown in FIG. 6B. Accordingly, the position and/or orientation of the apparatus may be tracked by one or more sensing device(s) 316 disclosed in the foregoing disclosure. For example, one or more sensors (e.g., accelerometer, gyroscope, inertial measuring unit (IMU), global positioning system (GPS)) may be utilized to determine a relative position (e.g., spatial) of the apparatus 100 or 200 (e.g., three coordinates) as well as a relative orientation of the apparatus 100 or 200 (e.g., three angles) with regard to the user. This tracking information may amount to 6 degrees of freedom for the apparatus 100 or 200 that may determine how the illumination may be generated.

In one embodiment, various functionalities and applications may be achieve by utilizing the tracking information of the apparatus 100. For example, the illumination generated by the apparatus 100 may be projected to one or more real object to generate images that may function as merged or augmented reality objects. For example, in a dark room, the apparatus 100 may generate a first three-dimensional (3D) object via the illumination when the apparatus is pointed toward a first direction (e.g., left), and a second 3D object may be generated by the illumination when the apparatus is pointed toward a second direction (e.g., right). For example, the first 3D object may be a dinosaur, and the second 3D object may be a dog. The 3D objects generated by the illumination of the apparatus 100 may be programmed to be any desired object, character, animal, etc. Alternatively, when the apparatus 100 is pointed toward a first direction, the first 3D object may be generated by the illumination of the apparatus. However, when the apparatus 100 is pointed toward a second direct, the first 3D object may disappear. Accordingly, many variations of applications may be programmed and implemented by the apparatus 100. In some embodiments, the apparatus 100 may function as an entertainment, gaming, advertising, or other suitable device. In one embodiment, the apparatus 100 may be utilized at a museum. For example, a user may enter a room in the museum with the apparatus 100, and when the apparatus 100 is pointed toward a certain direction or at a certain position (e.g., on a wall), the illumination generated by the apparatus 100 may reveal object relevant for the theme of the room at the museum.

In another embodiment, the apparatus 100 may be programmed to turn on or off based on the orientation or position of the apparatus 100. For example, if a user is in a room while holding the apparatus 100, and the users points at a certain location with the apparatus 100, the apparatus 100 may automatically turn on to illuminate an object in the direction the apparatus 100 may be pointing at. The object may be, for example, the head of a dinosaur. If the user turns the apparatus 100 in a different direction, the apparatus 100 may turn off the illumination. In some cases, each of multiple users may use the apparatus 100 simultaneously. Accordingly, the head of the dinosaur may be illuminated simultaneously by the multiple apparatuses 100.

Figure 6C:
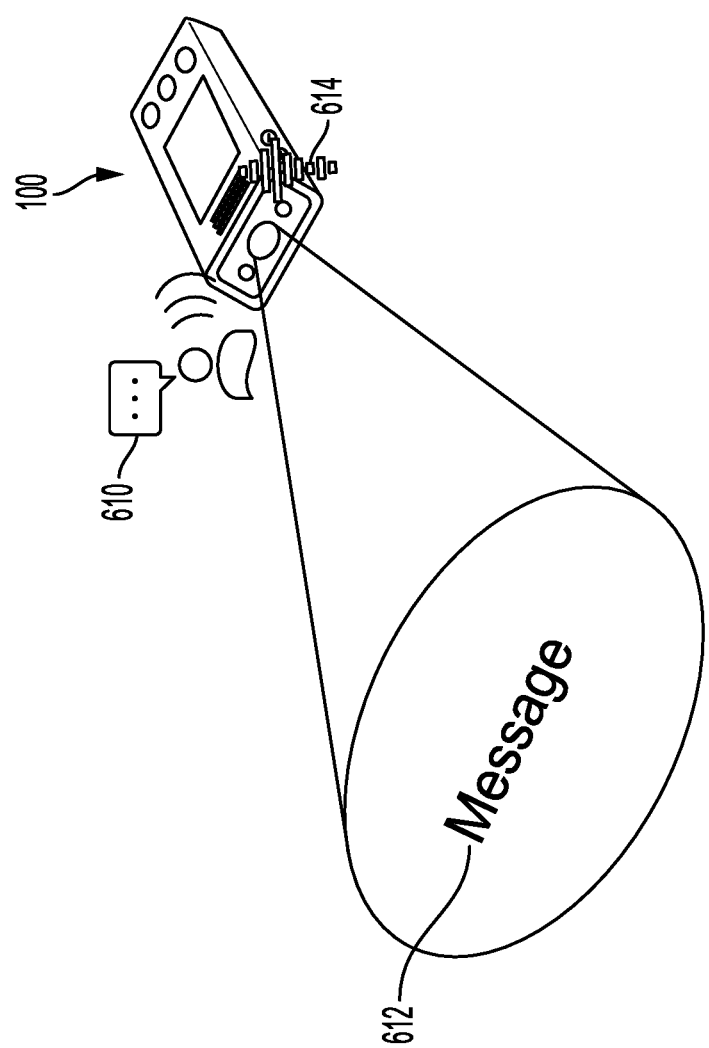
FIG. 6C illustrates a perspective view showing an exemplary illumination apparatus generating messages based a user audio input, according to aspects of the present disclosure.

FIG. 6C illustrates a perspective of an exemplary illumination apparatus 100 generating messages based a user audio input, according to aspects of the present disclosure. In this embodiment, a user may speak into the microphone(s) 118 or 308 of the apparatus 100 to generate alarm or other sounds, as well as illumination, in accordance with embodiments corresponding to FIGS. 1A-7. For example, when a user speaks a command 702 into the microphone(s)

118 or 308, the apparatus 100 generates illumination 704 with a message or an image corresponding with the command 702. Additionally or alternatively, the apparatus 100 may generate an audio output (e.g., alarm or other sounds) 706 corresponding with the command 702. Accordingly, the illumination 704 and the audio output 706 may serve, for example, as visual and/or audio beacon to aid a responder or helper in finding the user.

In one embodiment, the voice command 702 may be detected when one or more switches 108, 109, 110, 112a, and 112b of the apparatus 100 are actuated. Alternatively, the voice command 702 may be detected without actuation of the switches 108, 109, 110, 112a, and 112b. That is, the apparatus 100 may be in a listening mode to listen for user commands during operation of the apparatus 100. The voice detection feature of this embodiment may be helpful to operate the apparatus 100 when a user is unable to operate the apparatus 100, for example, in an emergency situation where the apparatus 100 cannot be reached or the user is unable to move. In some embodiments, the voice detection feature implements voice recognition so that only the voice of one or more authorized users enables performing the voice commands. In other embodiments, the voice detection feature is configured to perform the voice commands only when certain words or phrases are spoken by the user (e.g., "flashlight project now"). In other embodiments, the voice detection feature is configured to detect the tone, volume, prosody or other voice characteristics of the voice of the user to determine whether the user is in distress and to activate one or more functions according to the current disclosure, such as a light or sound output, an emergency call or message transmission via a network by connecting to a smart device, and the like. In one embodiment, the voice command 702 may be translated using a natural language processor to perform voice to text, voice to illumination, or voice to audio output functions.

The applications and the functionalities disclosed in the foregoing and following embodiments may be achieved by programming the apparatus 100 or 200 or system 300 in accordance with the description provided in connection with, for example, the system 300 shown in FIG. 3. That is, the apparatus 100 or 200 or system 300 in the foregoing and following embodiments may utilize, for example, a computer-readable media having stored thereon instructions configured to cause one or more computers or processors to perform any of the methods described herein. The functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages.

Figure 7:
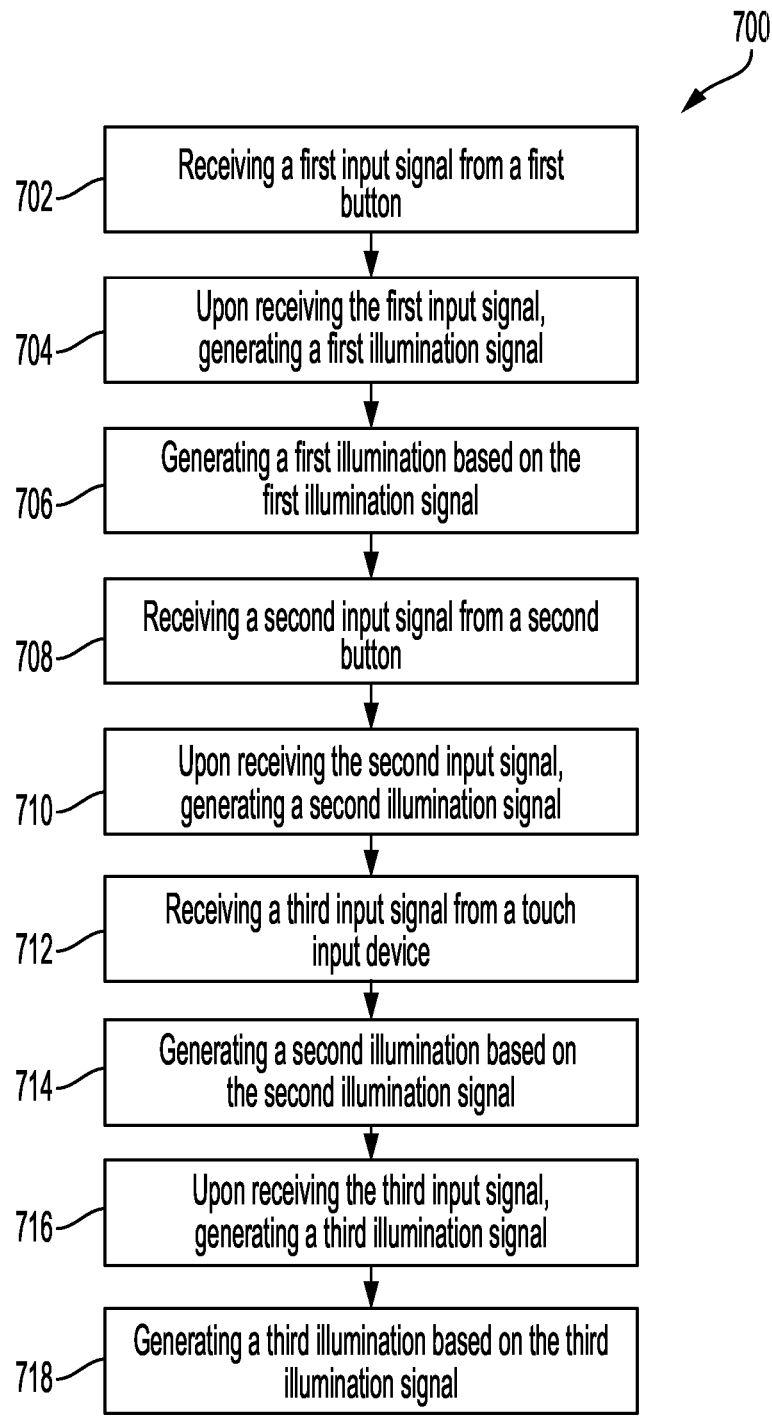
FIG. 7 illustrates a flowchart of an exemplary process for generating illumination, according to aspects of the present disclosure.

FIG. 7 illustrates a flowchart of an exemplary process 700 for executing functions of a multifunctional illumination based on the apparatus 100 or 200 or system 300 disclosed connection with FIGS. 1A-6C, according to aspects of the present disclosure.

In one embodiment, the method may be executed by the apparatus 100 or 200 or system 300. At step 702, the controller 304 may receive a first input signal from a first button. For example, the first button may be at least one of the control buttons 108, 109, 110, 112a, 112b, 122a, 122b, 208, 209, 210, 212a, 212b, 222a, or 222b. At step 704, upon receiving the first input signal, the controller 304 may generate a first illumination signal. At step 706, a first illumination may be generated based on the first illumination signal. For example, the first illumination may be generated by at least one of the light emitting device 104, 114, 116, 204, the light source(s) 310, or the illumination generation system 400. At step 708, the controller 304 may receive a second input signal from a second button. The second button may be at least one of the control buttons 108, 109, 110, 112a, 112b, 122a, 122b, 208, 209, 210, 212a, 212b, 222a, or 222b. At step 710, upon receiving the second input signal, the controller 304 may generate a second illumination signal. At step 712, a second illumination may be generated based on the second illumination signal. The second illumination may be generated by at least one of the light emitting device 104, 114, 116, 204, the light source(s) 310, or the illumination generation system 400. In one embodiment, the first illumination and the second illumination may comprise different or same illumination shape, pattern and/or size. In one embodiment, controller 304 may receive the second input signal for a first time period (e.g., 3 seconds), and upon receiving the second input signal for the first time period, one or more vibrations may be via a vibrating device. For example, the vibrating device may comprise the actuation device(s) 314 including integrated haptic or vibration generators to impart haptic signals or vibrations upon activation in connection with embodiments of the present disclosure. Further, upon receiving the second input signal for the first time period, the controller 304 may be configured to transmit a cellular or satellite call to a first number. The first number may be an emergency number (e.g., 911) or other emergency service or response entity. In one embodiment, after receiving the second input signal for the first time period, the controller 304 may receive an additional input signal from the second button for a second period of time (e.g., 3 to 5 seconds). Upon receiving the additional input signal for the second period of time, at least one of the speaker 118, 218, or 312 may generate an audio output. The audio output may be an alarm, siren, or other sounds.

Still referring to FIG. 7, at step 714, the controller 304 may receive a third input signal from a touch input device. For example, the touch input device may be the touchscreen input device 106, 206 or an input device 302. At step 716, upon receiving the third input signal, a third illumination signal may be generated. At step 716, a third illumination may be generated based on the third illumination signal. The third illumination may be generated by at least one of the light emitting device 104, 114, 116, 204, the light source(s) 310, or the illumination generation system 400. In one embodiment, the first illumination, the second illumination, and the third illumination may comprise different or same illumination shape, pattern and/or size.

In one embodiment, the controller 304 may receive a third input signal from a third button, and upon receiving the third input signal, the controller 304 activating the touch input device. In one embodiment, the controller 304 may determine a first orientation of the interactive illumination apparatus. The first orientation may be detected by a sensing device 316 (e.g., accelerometer or 6 degree of freedom sensor). Upon determining the first orientation, a fourth illumination may be generated based on a fourth illumination signal. Further, a second orientation of the interactive illumination apparatus may be determined by the controller 304, and upon determining the second orientation, a fifth illumination may be generated based on a fifth illumination signal. In one embodiment, upon determining the second orientation, the controller 304 may turn off the fourth illumination. The fourth and fifth illuminations may be generated by at least one of the light emitting device 104,

114, 116, 204, the light source(s) 310, or the illumination generation system 400. In one embodiment, the first to fifth illuminations may comprise different or same illumination shape, pattern and/or size.

In one embodiment, the controller 304 may receive a fourth input signal from a fourth button. The fourth button may comprise at least one of the control buttons 108, 109, 110, 112a, 112b, 122a, 122b, 208, 209, 210, 212a, 212b, 222a, or 222b. Upon receiving the fourth input signal, intensity of the first illumination or a size of the first illumination may be modified based on the fourth input signal. That is the intensity and size of the first illumination may be increased or decreased.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. An interactive illumination apparatus, comprising:
   a housing;
   a light emitting device arranged on a first end of the housing;
   a first button configured to detect a first input;
   at least one control button configured to detect a second input;
   a touchscreen input device including a touchscreen display configured to detect writing or drawing input from a user; and
   a battery in the housing,
   wherein the light emitting device is configured to generate a first illumination based on the first input,
   wherein the light emitting device is configured to modify the intensity, size or shape of the first illumination based on the second input, and
   wherein the light emitting device is configured to generate a second illumination based on the writing or drawing input.

2. The apparatus of claim 1, further comprising a solar panel on the housing,
   wherein the solar panel is configured to generate power to charge the rechargeable battery.

3. The apparatus of claim 1, wherein the light emitting device comprises a plurality of light emitting diodes or a laser excited phosphors.

4. The apparatus of claim 1, wherein the second illumination comprises a replica of the writing or drawing input.

5. The apparatus of claim 1,
   wherein the touchscreen display is configured to display a user interface including a graphical input element.

6. The apparatus of claim 1, further comprising:
   a speaker and a microphone in the housing,
   wherein the microphone is configured to detect an audio command of the user, and
   wherein the speaker is configured to generate a first sound or a third illumination based on the audio command.

7. The apparatus of claim 1, further comprising a sensing device in the housing configured to detect a position of the apparatus,
- wherein the light emitting device is configured to generate the first illumination based on a first position of the apparatus, and
- wherein the light emitting device is configured to generate a third illumination based on a second position of the apparatus.

8. The apparatus of claim 1, wherein the light emitting device comprises a programmable mask, and
- wherein the mask is configured to change a shape of the mask based on the first input or the writing or drawing input.

9. The apparatus of claim 1, further comprising a third button on the housing configured to detect a fourth input,
- wherein the touchscreen device is configured to activate based on the fourth input.

10. The apparatus of claim 1, further comprising a second control button on the housing configured to detect a fourth input,
- wherein the light emitting device is configured to modify the intensity, size or shape of the first illumination based on the fourth input.

11. A method of executing functions of an interactive illumination apparatus comprising:
- receiving a first input signal from a first button, and generating a first illumination based on the first input signal;
- receiving a second input signal from a control button, and modifying the intensity, size or shape of the first illumination based on the second input signal;
- receiving a third input signal from a touchscreen input device including a touchscreen display configured to detect writing or drawing input from a user, and generating a third illumination based on the third input signal.

12. The method of claim 11, further comprising:
receiving a fourth input signal from a third button; and
upon receiving the fourth input signal, activating the touch input device.

13. The method of claim 11, further comprising:
receiving the first input signal for a first time period;
upon receiving the first input signal for the first time period, generating one or more vibrations via a vibrating device; and
upon receiving the first input signal for the first time period, transmitting a cellular or satellite call to a first number.

14. The method of claim 13, further comprising:
after receiving the first input signal for the first time period, receiving an additional input signal from the first button for a second period of time; and
upon receiving the additional input signal for the second period of time, generating an audio output.

15. The method of claim 11, further comprising:
determining a first orientation of the interactive illumination apparatus;
upon determining the first orientation, generating a fourth illumination based on a fourth illumination signal;
determining a second orientation of the interactive illumination apparatus; and
upon determining the second orientation, generating a fifth illumination based on a fifth illumination signal.

16. The method of claim 11, further comprising:
determining a first orientation of the interactive illumination apparatus;
upon determining the first orientation, generating a fourth illumination based on a fourth illumination signal;
determining a second orientation of the interactive illumination apparatus; and
upon determining the second orientation, turning off the fourth illumination.

17. The method of claim 11, further comprising:
receiving a fourth input signal from a second control button; and
upon receiving the fourth input signal, modifying the intensity, size or shape of the first illumination.

18. A non-transitory computer-readable medium storing instructions for executing functions of an interactive illumination apparatus, the instructions, when executed by one or more processors, causing the one or more processors to perform operations comprising:
- receiving a first input signal from a first button, and generating a first illumination based on the first input signal;
- receiving a second input signal from a control button, and modifying the intensity, size or shape of the first illumination based on the second input signal;
- receiving a third input signal from a touchscreen input device including a touchscreen display configured to detect writing or drawing input from a user, and generating a third illumination based on the third input signal.

* * * * *